US010628263B1

(12) United States Patent
Cowen et al.

(10) Patent No.: US 10,628,263 B1
(45) Date of Patent: Apr. 21, 2020

(54) LOGFILE-RELATED TECHNOLOGIES AND TECHNIQUES

(71) Applicants: David Cowen, Murphy, TX (US); Matthew Seyer, Garland, TX (US); Rafael Gorgal, Mesquite, TX (US)

(72) Inventors: David Cowen, Murphy, TX (US); Matthew Seyer, Garland, TX (US); Rafael Gorgal, Mesquite, TX (US)

(*) Notice: Subject to any disclaimer, the term of this patent is extended or adjusted under 35 U.S.C. 154(b) by 184 days.

(21) Appl. No.: 14/448,952

(22) Filed: Jul. 31, 2014

Related U.S. Application Data

(60) Provisional application No. 61/861,500, filed on Aug. 2, 2013.

(51) Int. Cl.
G06F 17/00 (2019.01)
G06F 7/00 (2006.01)
G06F 11/14 (2006.01)

(52) U.S. Cl.
CPC .................. G06F 11/1448 (2013.01)

(58) Field of Classification Search
CPC .................................... G06F 11/1448
USPC ........................................... 707/648
See application file for complete search history.

(56) References Cited

U.S. PATENT DOCUMENTS

| 5,568,639 | A * | 10/1996 | Wilcox | G06F 16/1805 |
| | | | | 711/170 |
| 6,377,958 | B1 * | 4/2002 | Orcutt | G06F 16/116 |
| | | | | 707/690 |
| 6,725,392 | B1 * | 4/2004 | Frey | G06F 11/1076 |
| | | | | 714/15 |
| 7,013,379 | B1 * | 3/2006 | Testardi | G06F 3/0613 |
| | | | | 711/206 |
| 7,689,599 | B1 | 3/2010 | Shah et al. | |
| 7,783,615 | B1 * | 8/2010 | Compton | G06F 16/122 |
| | | | | 707/694 |
| 7,805,416 | B1 * | 9/2010 | Compton | G06F 16/156 |
| | | | | 707/694 |
| 7,970,804 | B2 * | 6/2011 | Tang | G06F 16/1815 |
| | | | | 707/822 |
| 8,554,734 | B1 | 10/2013 | Chatterjee et al. | |
| 8,683,262 | B1 | 3/2014 | Subbiah et al. | |
| 8,959,054 | B1 | 2/2015 | Natanzon | |
| 9,128,901 | B1 * | 9/2015 | Nickurak | G06F 16/27 |
| 9,158,804 | B1 * | 10/2015 | Rangapuram | G06F 16/2365 |
| 2002/0007363 | A1 | 1/2002 | Vaitzblit | |
| 2003/0097611 | A1 | 5/2003 | Delaney et al. | |
| 2005/0098623 | A1 | 5/2005 | Kim | |
| 2006/0101097 | A1 * | 5/2006 | Barboi | G06F 11/1471 |
| | | | | 707/999.204 |

(Continued)

FOREIGN PATENT DOCUMENTS

WO 99/27750 A1 6/1999

OTHER PUBLICATIONS

Ding et al. "Time Based Data Forensic and Cross-Reference Analysis"m Mar. 21-23, 2011, ACM, 185-190 (Year: 2011).*

(Continued)

Primary Examiner — Pavan Mamillapalli
(74) Attorney, Agent, or Firm — Brian J. Pangrle

(57) ABSTRACT

A method can include receiving information of a journaling file system; parsing at least a portion of the information for a journaled entry; and, for the journaled entry, performing a reverse journal replay with respect to file catalog of the journaling file system to establish a file system state.

20 Claims, 17 Drawing Sheets

(56) References Cited

U.S. PATENT DOCUMENTS

| | | | |
|---|---|---|---|
| 2006/0294589 A1 | 12/2006 | Achanta et al. | |
| 2007/0162513 A1 | 7/2007 | Lewin et al. | |
| 2007/0198550 A1* | 8/2007 | Irving | G06F 16/16 |
| 2007/0266037 A1* | 11/2007 | Terry | G06F 3/0607 |
| | | | 707/999.1 |
| 2008/0162590 A1 | 7/2008 | Kundu et al. | |
| 2008/0256139 A1* | 10/2008 | Jessee | G06F 11/1435 |
| 2009/0198689 A1* | 8/2009 | Frazier | G06F 21/645 |
| 2009/0222463 A1* | 9/2009 | Clark | G06F 11/3438 |
| 2010/0174684 A1 | 7/2010 | Schwaab et al. | |
| 2010/0205392 A1 | 8/2010 | Schnapp et al. | |
| 2011/0004585 A1 | 1/2011 | Becker et al. | |
| 2012/0266208 A1 | 10/2012 | Morris et al. | |
| 2015/0178171 A1* | 6/2015 | Bish | G06F 11/1451 |
| | | | 714/20 |
| 2015/0261955 A1* | 9/2015 | Huang | G06F 21/562 |
| | | | 726/23 |
| 2017/0031783 A1* | 2/2017 | Kedem | G06F 11/1451 |

OTHER PUBLICATIONS

Cho et al. "Finding Forensic Information on Creating a Folder in $LogFile of NTFS", 2011, ICDF2C Social Informatics and Telecommunications Engineering, pp. 211-225 (Year: 2011).*

Webroot, SecureAnywhere Business Endpoint Protection, Rapid Rollback, www.webroot.com, accessed Feb. 25, 2016, Copyright 2004-2016 (5 pages).

Rubenking, PCMAG, WEBROOT, SecureAnywhere AntiVirus, Dec. 10, 2018 (13 pages).

Webroot, Webroot and Computergate Partner to Deliver Managed Web Security Service for Businesses, Press Release, Aug. 21, 2013 (4 pages).

Webroot, Webroot Helps Consumers Stay One Step Ahead of Cybercriminals with Latest SecureAnywhere™ Protection Portfolio, Press Release, Oct. 7, 2014 (5 pages).

Webroot, Webroot Revolutionizes Endpoint Security with the Fastest, Lightest, Easiest-to-Manage Protection, Press Release, Feb. 21, 2012 (5 pages).

NTFS Reference Sheet, Wilkinson, www.writeblocked.org, 2011 (4 pages).

Elrick, D., Artifacts of CD Burning in the Microsoft Windows Master File Table, Abstract, Oct. 7, 2011 (2 pages).

Cowen, Hacking Exposed, New Project, Tool Testing, May 27, 2012 (3 pages).

Cowen, Hacking Exposed, CEIC 2012—Anti Anti Forensic Materials, Jun. 1, 2012 (3 pages).

Cowen, Hacking Exposed, Updates and status, Aug. 8, 2012, (3 pages).

Cowen, Hacking Exposed, Blog Post #32: Go Bag Part 7 End of Series, Jul. 25, 2013 (11 pages).

Cowen, CEIC 2012, May 21-24, 2012 (18 pages).

Oh, Junghoon (blueangle), A Dig into the $LogFile, Forensic Insight Seminar, Jun. 5, 2012 (51 pages).

Burghardt, Using the HFT+ Journal for Deleted File Recovery, DFRWS Aug. 11-13, 2008, Digital Investigation, 5 (2008) S76-S82 (8 pages).

Cowen et al., File System Journal Analysis, Digital Forensics & Incident Response Summit 2013 (Jul. 2013) SANS Institute (25 pages).

Singireddy, Recoverability Support in Windows NT File System (NTFS), Apr. 10, 2010 (5 pages).

* cited by examiner

System 900

Example: USN Record 1410

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 0x00 | Record Length |   |   |   | Major V |   | Minor V |   | File Reference Number |   |   |   |   |   |   |   |
| 0x10 | Parent Reference Number |   |   |   |   |   |   |   | Update Sequence Number (USN)* |   |   |   |   |   |   |   |
| 0x20 | Datetime |   |   |   |   |   |   |   | Reason |   |   |   | SourceInfo |   |   |   |
| 0x30 | SecurityID |   |   |   | File Attributes |   |   |   | N Length |   | N Offset |   | Name [N Length] |   |   |   |

Fig. 14

LOGFILE-RELATED TECHNOLOGIES AND TECHNIQUES

RELATED APPLICATION

This application claims priority to and the benefit of a U.S. Provisional Patent Application having Ser. No. 61/861,500, filed 2 Aug. 2013, which is incorporated by reference herein including the Appendixes that were attached thereto and that formed part of the U.S. Provisional Patent Application.

BACKGROUND

An information handling system may handle information in a manner where certain handling operations and associated information are logged, tracked, etc.

SUMMARY

A method can include receiving information of a journaling file system; parsing at least a portion of the information for a journaled entry; and, for the journaled entry, performing a reverse journal replay with respect to file catalog of the journaling file system to establish a file system state. Various other examples of methods, devices, systems, etc. are also disclosed.

BRIEF DESCRIPTION OF THE DRAWINGS

Features and advantages of the described implementations can be more readily understood by reference to the following description taken in conjunction with the accompanying drawings.

FIG. 14 is a diagram of an example of a data structure;

DETAILED DESCRIPTION

Figure 1:
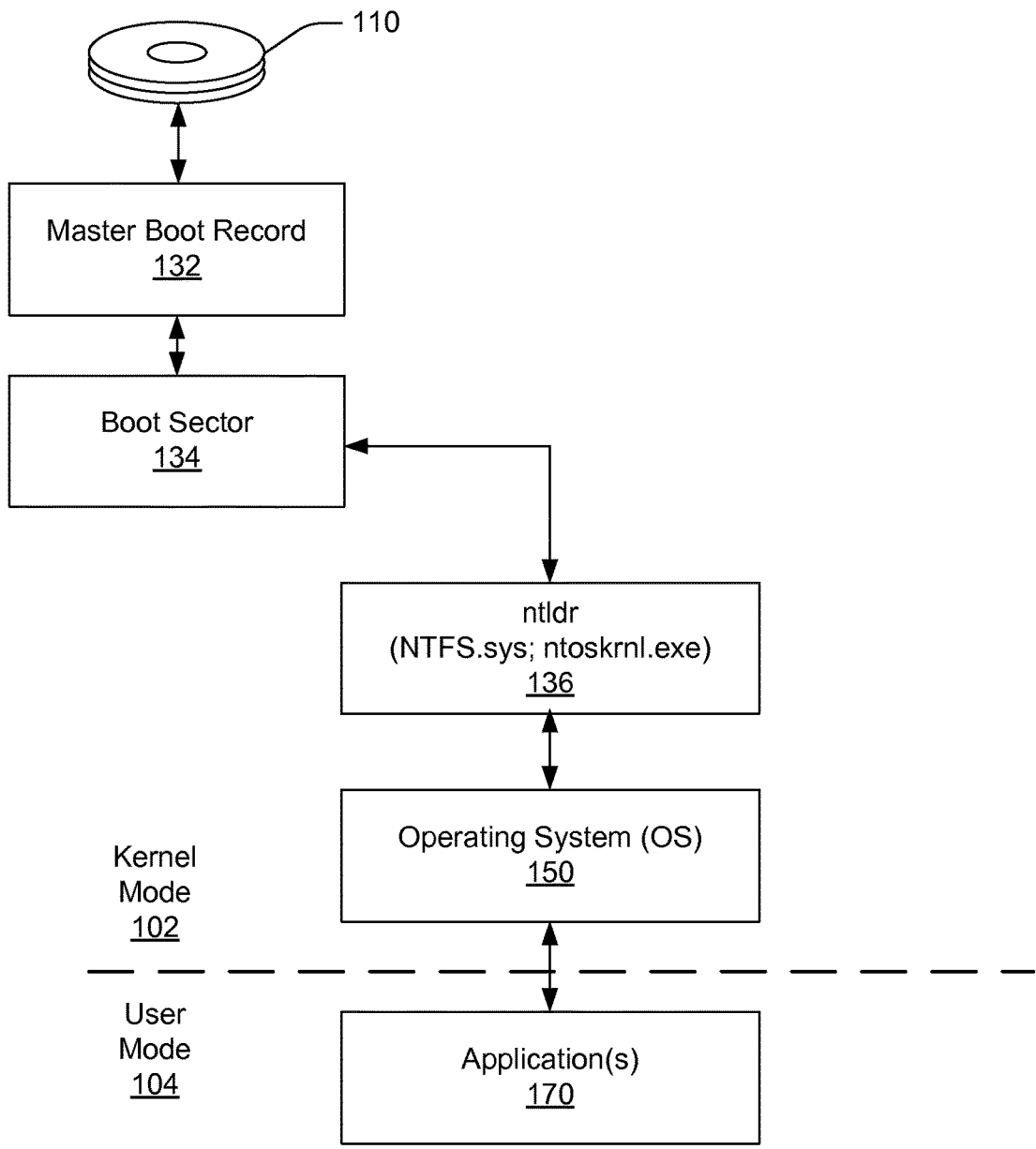
FIG. 1 is a diagram of an architecture.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As an example, an information handling system may include a file system where files are constructs for storage of information, handling information, etc. As an example, a file system may include various features of the New Technology File System (NTFS) developed and marketed by Microsoft Corporation (Redmond, Wash.).

NTFS finds use, for example, in the WINDOWS® NT line of operating systems, beginning with WINDOWS® NT 3.1 and WINDOWS® 2000, including WINDOWS® XP, WINDOWS® Server 2003, and successive operating systems (e.g., VISTA®, WINDOWS® 7, WINDOWS® 8, etc.).

NTFS, in comparison to FAT and HPFS (High Performance File System), includes features that support metadata and the use of advanced data structures to improve performance, reliability, and disk space utilization, plus additional extensions, such as security access control lists (ACL) and file system journaling.

The NTFS file system includes a file called the master file table (MFT). For example, there may be at least one entry in the MFT for every file on an NTFS volume, including the MFT itself. As an example, information about a file, including its size, time and date stamps, permissions, and data content may be either stored in MFT entries or in space external to the MFT but described by the MFT entries.

As an example, where files are added to an NTFS volume, more entries may be added to the MFT such that the MFT increases in size. As an example, when files are deleted from an NTFS volume, their MFT entries may be marked as free and may be reused, however, the MFT may not shrink (e.g., space used by these entries may not be automatically reclaimed from the disk).

As an example, NTFS may reserve a percentage (e.g., about 12.5 percent) of a volume for exclusive use of the MFT until and unless the remainder of the volume is completely used up. In such an example, space for files and directories may not be allocated from this MFT zone until all other space is allocated first.

In NTFS, a MFT (e.g., a master file table) may exist as a file that may have a name that begins with "$" (e.g., $MFT). NTFS may use various types of files (e.g., metadata files) that may include information germane to implementation, maintenance, management, etc. of a file system structure. One or more of such files may begin with "$", as an example, such a file may be "hidden". Some examples of NTFS file names include $MFT, $UsnJrnl and $LogFile.

As a "journaling" file system, NTFS includes a log, for example, to record metadata changes to a volume. Such a log may be stored with a file name $LogFile. NTFS may also include a change journal, for example, NTFS may include a so-called USN Journal (Update Sequence Number Journal) that provides for recording one or more changes on a NTFS volume. Such a journal may be stored with a file name $UsnJrnl. As an example, a journal may be maintained for each NTFS volume, which may begin as an empty file where, when a change is made to the volume, a record is added to the file. In such an example, each record may be identified by, for example, a 64-bit Update Sequence Number or USN. As an example, each record in a change journal may include an USN, a name of a file, and information about a change.

A USN change journal may be a system management feature that records changes to files, streams and directories on a volume and, for example, various attributes and security settings.

FIG. 1 shows an example of an architecture 100 for NTFS technologies and techniques with respect to an operating system (or operating systems) and applications that may be executable on hardware via the operating system (or operating systems). FIG. 1 shows a NTFS boot sector 112, a master file table 114 (MFT), file system data 116, and a master file table copy 118 (MFT copy).

Shown generally as a process that may be performed, for example, in part in a kernel mode 102 and in part in a user mode 104, one or more applications 170 may interact with an operating system 150 where the operating system 150 interacts with a file system such as a NTFS file system. For example, the operating system 150 may aim to perform one or more operations associated with a storage medium 110 (e.g., a drive) such as accessing a file stored in the storage medium 110, etc. As shown, the file system may maintain a master boot record 132, boot sectors 134 and an ntldr file 136.

As an example, when a computing device is powered on, BIOS or other software may follow a configured boot order to find a bootable component such as, for example, a hard drive, a floppy drive, a CD/DVD drive, network connection drive, USB-device, etc. As an example, a boot loader file (e.g., the ntldr file 136) may exist, which may be in a boot sector (e.g., the boot sector 134) of a master boot record (e.g., the master boot record 132). As an example, a boot manager with an {ntldr} entry pointing to another partition with an ntldr boot sector may exist. As an example, when booting, a loader portion of an ntldr file may access a file system on the boot drive (e.g., a NTFS drive).

In the example of FIG. 1, the ntldr file 136 is shown as including NTFS.sys and ntoskrnl.exe. The executable file ntoskrnl.exe ("WINDOWS® NT operating system kernel") is a kernel image that provides the kernel and executive layers of the WINDOWS® NT kernel space; while NTFS-.sys is WINDOWS® driver for NTFS.

As an example, in the NTFS architecture 100, a first 16 records of a MFT may be reserved for metadata files (e.g., approximately 16 KB), for example, to be used to describe the MFT. Metadata files that begin with a dollar sign ($) are described in the table Metadata Files Stored in the MFT. Remaining records of a MFT may include file and folder records for each file and folder on a volume.

As an example, a master file table may have a name "$Mft", be a first record (e.g., "0") and include a base file record for each file and folder on an NTFS volume. As an example, if allocation information for a file or folder is too large to fit within a single record, other file records may be allocated.

As an example, a log file (e.g., or logfile) may have a name "$LogFile", be a third record (e.g., "2") and include information used by NTFS for faster recoverability. For example, a log file is used by WINDOWS® Server 2003 to restore metadata consistency to NTFS after a system failure. The size of a log file may depend on a size of a volume; noting that size of the log file may be adjusted, for example, by using a Chkdsk command.

Figure 2:
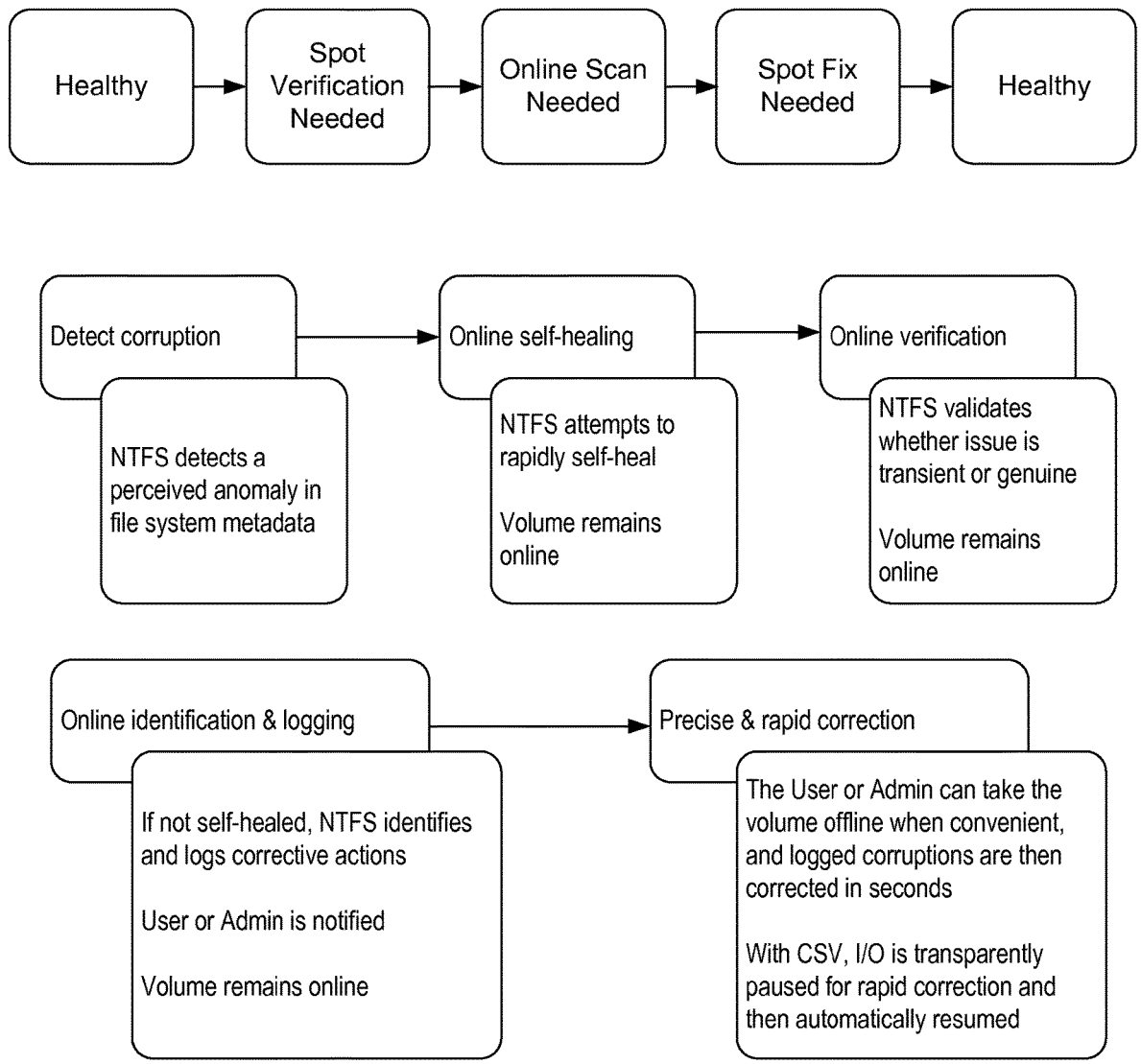
FIG. 2 is a diagram of NTFS features.

FIG. 2 shows an example of an arrangement of blocks 200 to describe how some features of NTFS may operate for an information handling system that includes an operating system such as the Windows 8 operating system. Such an example is shown to demonstrate some features that may help to maintain storage "health". As may be appreciated, information stored in various files may be used in one or more states for managing a file system.

Storage media health, file system management, etc. may be reasonable concerns for an ordinary user of a computer, computing system, storage media, etc. However, for a user or for others, features of NTFS may be incomplete for various purposes. For example, consider a storage media that may be suspected to have included particular information that a user may have deleted, accidentally, intentionally, etc.

As an example, a user may implement an application such as, for example, the CCLEANER™ application (e.g., or BLEACHBIT™ application, etc.) to clean temporary or potentially unwanted files left by certain programs, including INTERNET EXPLORER™, FIREFOX™, GOOGLE CHROME™, OPERA™, SAFARI™, WINDOWS MEDIA PLAYER™, EMULE™, GOOGLE TOOLBAR™, NETSCAPE™, MICROSOFT OFFICE™, NERO™, ADOBE ACROBAT™, MCAFEE™, ADOBE FLASH PLAYER™, SUN JAVA™ WINRAR™, WINACE™, WINZIP™, GIMP™ and other applications along with browsing history, cookies, recycle bin, memory dumps, file fragments, log files, system caches, application data, autocomplete form history, and various other data. As an example, such an application may wipe a MFT free space of a drive, or the entire drive itself.

As an example, an eraser application may include features to perform operations such as, for example: identifying and removing Web cache, HTTP cookies, URL history, temporary files log files and FLASH™ cookies for applications such as FIREFOX™, OPERA™, SAFARI™, APT™, and GOOGLE CHROME™, etc.; removing unused localizations (e.g. locale files) that may be translations of software; shredding files and wiping unallocated disk space to minimize data remanence; wiping unallocated disk space; vacuuming FIREFOX's SQLite database; etc. As an example, at least a portion of such operations may be of interest in a forensic analysis.

As an example, an eraser application may include features to perform operations such as, for example, cleaning of temporary or potentially unwanted files left by certain programs (e.g., INTERNET EXPLORER™ FIREFOX™, GOOGLE CHROME™, OPERA™, SAFARI™, WINDOWS MEDIA PLAYER™, EMULE™, GOOGLE TOOLBAR™, NETSCAPE™, MICROSOFT OFFICE™, NERO™, ADOBE ACROBAT™, MCAFEE™, ADOBE FLASH PLAYER™, SUN JAVA™, WINRAR™, WINACE™, WINZIP™, GIMP™, etc.), which may include browsing history, cookies, recycle bin, memory dumps, file fragments, log files, system caches, application data, autocomplete form history, etc. As an example, at least a portion of such operations may be of interest in a forensic analysis.

As an example, a forensic parser may include receiving information of a journaling file system; parsing at least a portion of the information for one or more journaled entries; and, for individual ones of the one or more journaled entries, performing a reverse journal replay with respect to a file catalog of the journaling file system to establish a file system state. In such an example, the performing may be repeated to establish successive file system states that are ordered backwards in time. As an example, a method may be performed iteratively where a loop or loop may exist, for example, as to receiving and/or parsing and where, for example, reverse journal replays are performed individually to establish successive file system states that are ordered backwards in time.

As an example, file system states established via reverse journal replays, journaled entries, etc. may be analyzed for evidence of operations that may be associated with an activity, which may be an activity of an individual instructing a computing device to perform operations, an activity of an application (e.g., program, script, etc.) instructing a computing device to perform operations, etc.

For any of a variety of reasons, it may be desirable to determine what may have been done to information in a file system as stored on one or more storage media.

As an example, a forensic parser may be implemented that can determine, at least in part, one or more past states of information, for example, with respect to a file system, a storage medium, etc.

As an example, consider a use case that includes detecting application of one or more "anti-forensic" techniques to information (e.g. a file system, a storage medium, etc.). Scenarios or use cases may involve investigating whether an alteration technique (e.g., altering file system information, information on a storage medium, etc.) has been or is being used by a piece of malware (e.g., optionally in a manner that seeks to avoid detection), whether a person is trying to avoid someone finding out what they deleted using one or more tools (e.g., CCLEANER™ tool, etc.), etc. In such scenarios, a forensic parser may be implemented to help uncover facts as to what happened or may have happened, for example, over a period of time (e.g., within the last two weeks or longer if an information handling system may have volume shadow copies enabled).

As an example, a forensic parser was implemented in a trial to recover names of deleted files and their metadata, even where it had been purged out of the MFT, for example, including metadata associated with the file (e.g., directory, creation, modification and access times).

As an example, a forensic parser was implemented to recover a complete rename operation showing cleanly which file became which file, for example, including parsing out the directory, creation, modification and access times before and after the operation. In such an example, a graphical user interface displayed recovered metadata from files that were wiped with an eraser. Such an approach may allow one to undo what an eraser application (e.g., a wiper) has done (e.g., except for recover contents of a file itself).

As an example, a forensic parser was implemented to determine if files were written to one or more other drives and, for example, an approximation of how many.

As an example, a forensic parser may recover original metadata of a file when it was created and, as an example, recover timestamps that may have been altered.

As an example, a forensic parser may be in the form of instructions stored in a computer-readable medium and executable by a processor. As an example, instructions may comport with Perl (e.g., Perl instructions).

As an example, a forensic parser may provide for extraction of creation/deletion/rename events from a USN change journal, for example, even if they do not exist in a $LogFile. As an example, a forensic parser may include a feature to import multiple mfts/logfiles/usns at a time and, for example, associate them with a custodian (e.g., for a WINDOWS® VISTA®, 7 or 8 operating system).

As an example, a forensic parser was used in trials, which was referred to as an Advanced NTFS Journal Parser (ANJP). As an example, such a forensic parser may be extended to Ext3 and HFS+ (e.g., AEJP and AHJP parsers).

As an example, the ANJP identified deleted files with full metadata, where, in testing on the NIST CFReDS images, it was possible to recover deleted file records with full metadata. The ANJP also provided for identification of files being created with full metadata, identification of files being renamed with metadata before and after the rename and Log 2timeline output.

As an example, the ANJP may parse a log, event records, redo/undo operation codes and stitch those together to find information germane to a user. A forensic parser may provide for operations such as how to take Update Sequence Arrays, timestamp changes, file id/directory ids and tie them back into the MFT, recovering resident files, identifying the approximate number of external drives changes, determining how many systems an external drive was plugged into and be able to make reliable conclusions from them for use in case work.

As an example, use cases may include recovering files burned to a CD, determining how many changes occurred to an external disk plugged in, which operating systems wrote to a disk and what files were being accessed from an OUTLOOK® application.

As an example, an application may expand on current "anti-software" applications (e.g., or forensic applications) by offering rule logic to automatically detect by product and version the use of known anti-forensic, exfiltration and access software. Beyond this autodetection mechanism it may, for example, allow a user to scale up the processing of the artifact data to enterprise systems and access forensic images directly via automation.

As an example, a method may include: Parse the MFT, USN Journal and LogFile (e.g., $MFT, $USNJrnl and $LogFile); Query the records for the interrelations between them (e.g., MFT to USN Journal, USN Journal to LogFile) to match up the records and timeline the activities; and Match the returned activities to known patterns of creation, deletion, renaming and attribute changes and report on them.

As an example, a forensic parser may be configured to parse a file system metadata journal for NTFS and combine it with a change journal and a master file table to determine prior states of files and actions taken against the system. In such an example, where interrelations between the data sources, unknown before parsing such sources of information, are combined, as an example, a unique sequence of actions may be seen for distinct operations that allow for report generation as to what actions were performed and when. Knowledge of such operations may allow for the detection and potential reversal of actions such as file wiping, cd burning, data exfiltration, timestamp modification and malware anti-forensic techniques.

Figure 3:
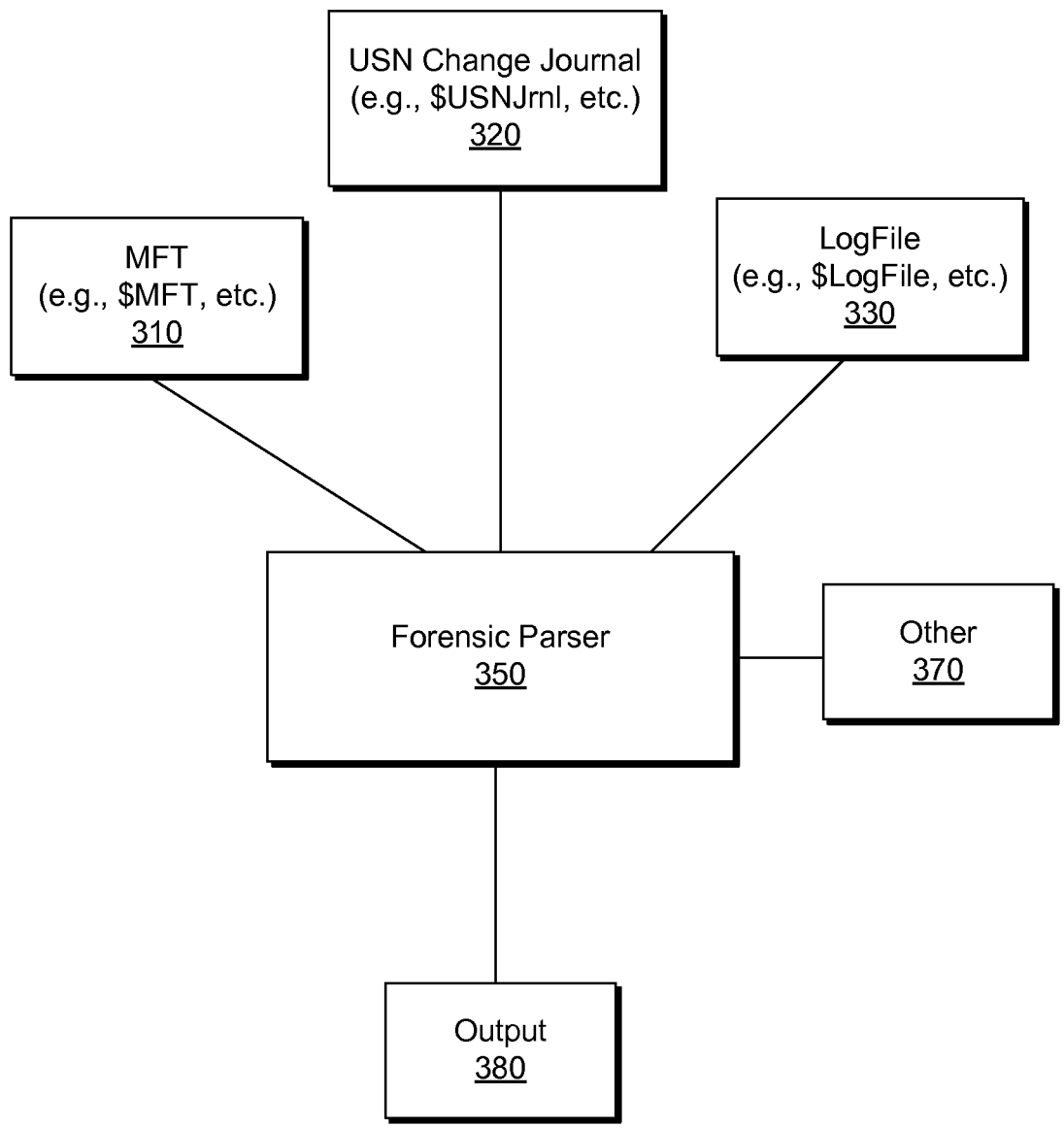
FIG. 3 is a diagram of an example of a system and a method.

FIG. 3 shows an example of a system and a method 300. As shown, a forensic parser 350 can process information in a MFT 310, a change journal 320 (e.g., a USN change journal), a logfile 330 and optionally from one or more other sources 370 to generate output 380. The output 380 may indicate, for example, that one or more volumes include overwritten files (e.g., erased, wiped, etc.), transferred files, etc.

Figure 4:
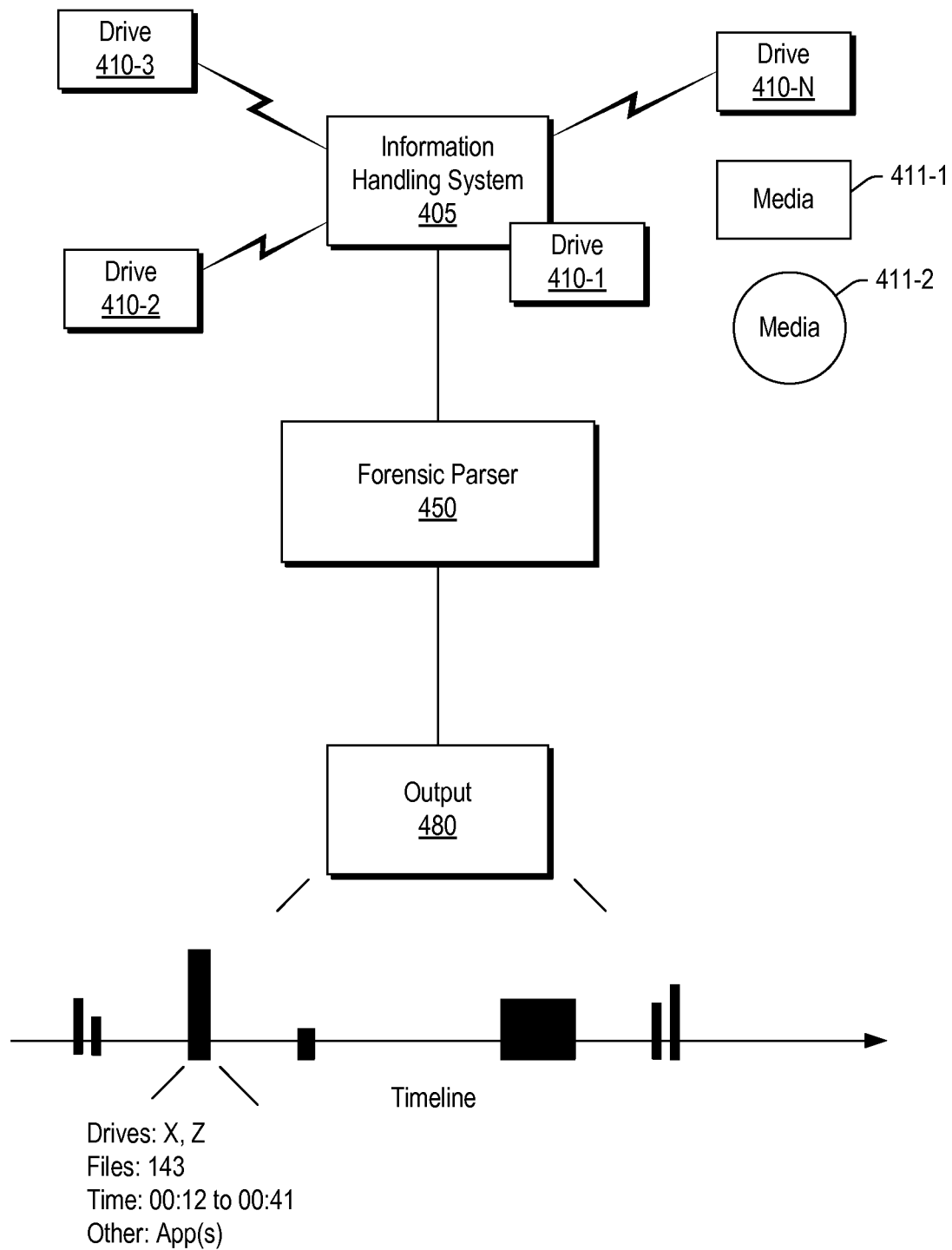
FIG. 4 is a diagram of an example of a system and a method.

FIG. 4 shows an example of a system and a method 400. As shown, a forensic parser 450 can process information in an information handling system 405 that is operatively coupled to (e.g., or has been operatively coupled to) one or more drives 410-1, 410-2, 410-3, . . . , 410-N, which may be configured for receipt of removable media 411-1, 411-2, etc. (e.g., a SD card, a CD, etc.), to generate output 480. The output 480 may indicate, for example, that one or more volumes include overwritten files (e.g., erased, wiped, etc.), transferred files, etc. As an example, a timeline may be generated (e.g., as data renderable to a display, a printer, a graphical user interface (GUI), etc.). As an example, such a timeline may be interactive in that a user may navigate a pointing device or point on a touchscreen to call for rendering of more detailed information about one or more events along a timeline. As an example, a graphic may represent a duration, a number of files, a type of file, a type of action, etc., optionally using graphics, color, animation, etc. As an example, audio may be provided that indicates an alert, additional information, etc.

Figure 5:
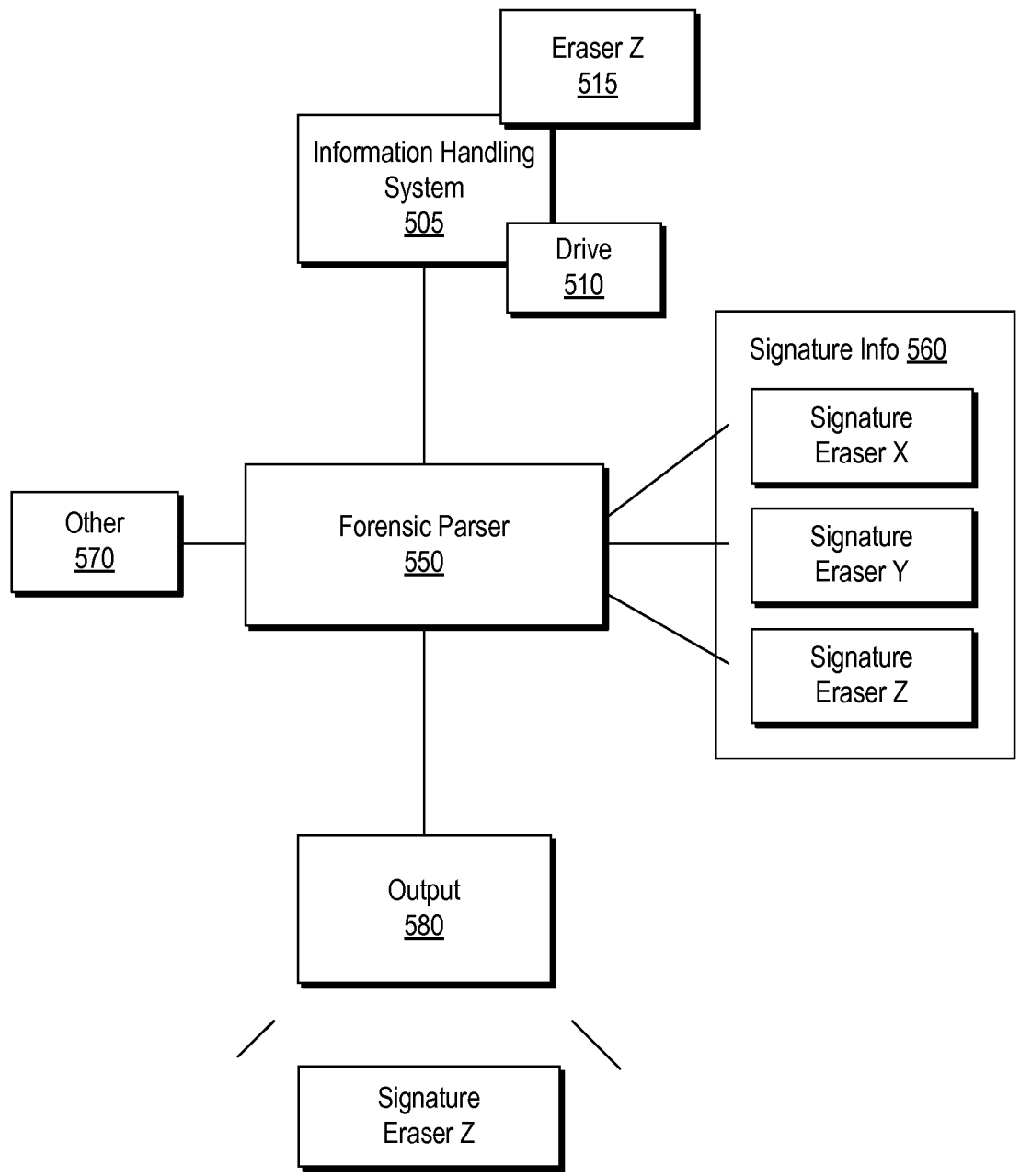
FIG. 5 is a diagram of an example of a system and a method.

FIG. 5 shows an example of a system and a method 500. As shown, a forensic parser 550 can process information in an information handling system (IHS) 505 that is operatively coupled to (e.g., or has been operatively coupled to) one or more drives 510, to generate output 580. As an example, the IHS 505 may include executable code to perform one or more erasing operations to erase information from the drive (see, e.g., an application Eraser Z 515). As shown, the forensic parser 550 may include a database or access thereto of various signatures 560 of applications that may perform one or more erasing operations. For example, an eraser application may perform operations in a serial order that leaves a trail in one or more of a MFT, a change journal and a logfile (e.g., file name change, timing of overwrite with respect to a file name operation, etc.). As an example, the output 580 may generate, in part, a most likely eraser application (e.g., by matching evidence to a signature). As an example, the forensic parser 550 may access and/or include other information 570.

Figure 6:
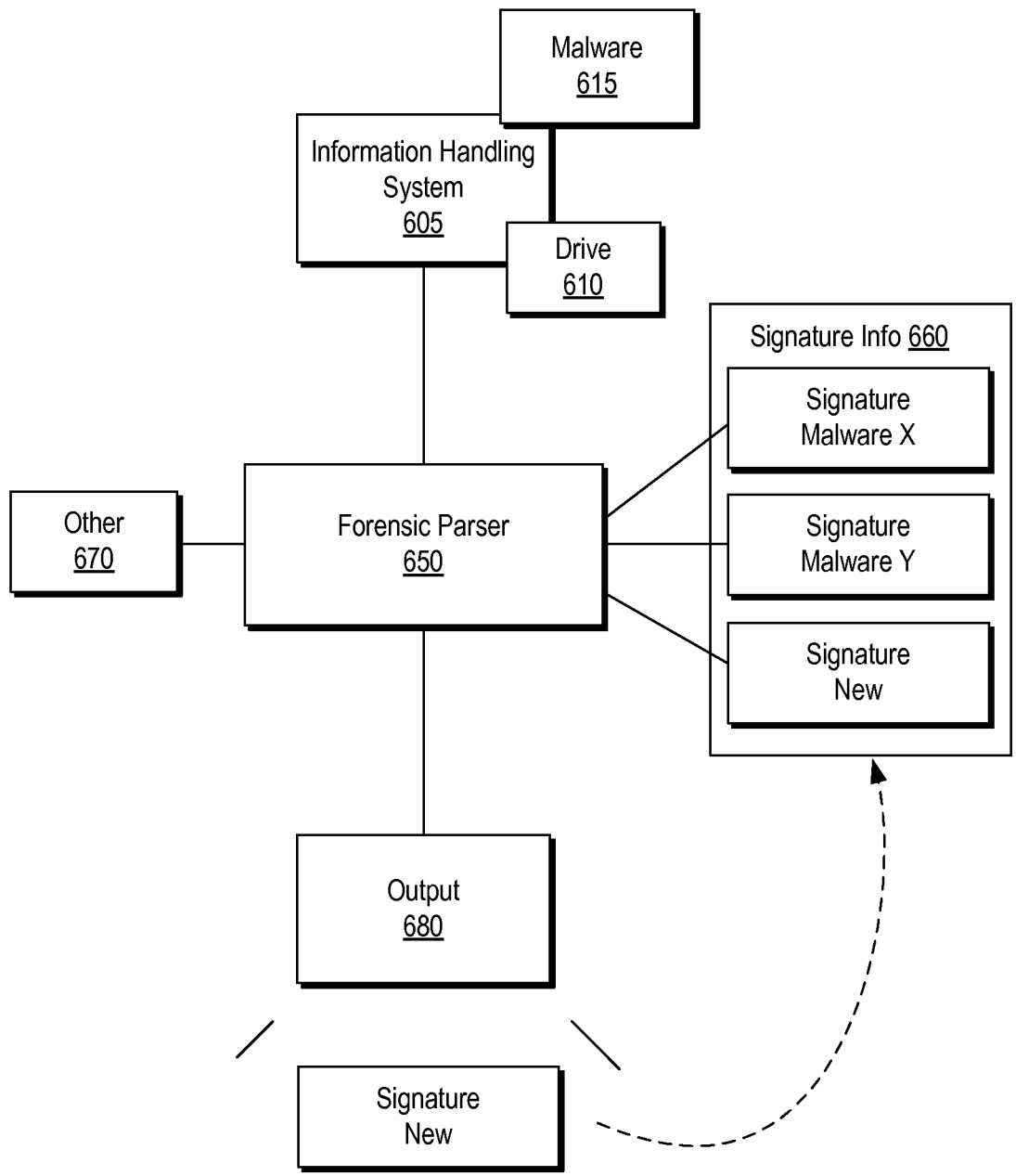
FIG. 6 is a diagram of an example of a system and a method.

FIG. 6 shows an example of a system and a method 600. As shown, a forensic parser 650 can process information in an information handling system (IHS) 605 that is operatively coupled to (e.g., or has been operatively coupled to) one or more drives 610, to generate output 680. As an example, the IHS 605 may include executable code to perform one or more malicious operations (e.g., code labeled malware 615).

Malware (e.g., malicious software) may be used or programmed by attackers to disrupt computer operation, gather sensitive information, gain access to private computer systems, etc. Malware may appear in the form of code, scripts, active content, and other software. Malware can include computer viruses, ransomware, worms, trojan horses, rootkits, keyloggers, dialers, spyware, adware, malicious BHOs, rogue security software and other malicious programs.

As shown in the example of FIG. 6, the forensic parser 650 may include a database or access thereto of various signatures 660 of applications that perform one or more malicious operations. For example, a malicious application may perform operations in a serial order that leaves a trail in one or more of a MFT, a change journal and a logfile (e.g., file name change, timing of overwrite with respect to a file name operation, etc.). As an example, the output 680 may generate, in part, a most likely malicious application (e.g., by matching evidence to a signature). As an example, where a new signature (e.g., or modified signature) is found, it may be provided to the database as an update. As shown in the example of FIG. 6, the forensic parser 650 may access and/or include other information 670.

Figure 7:
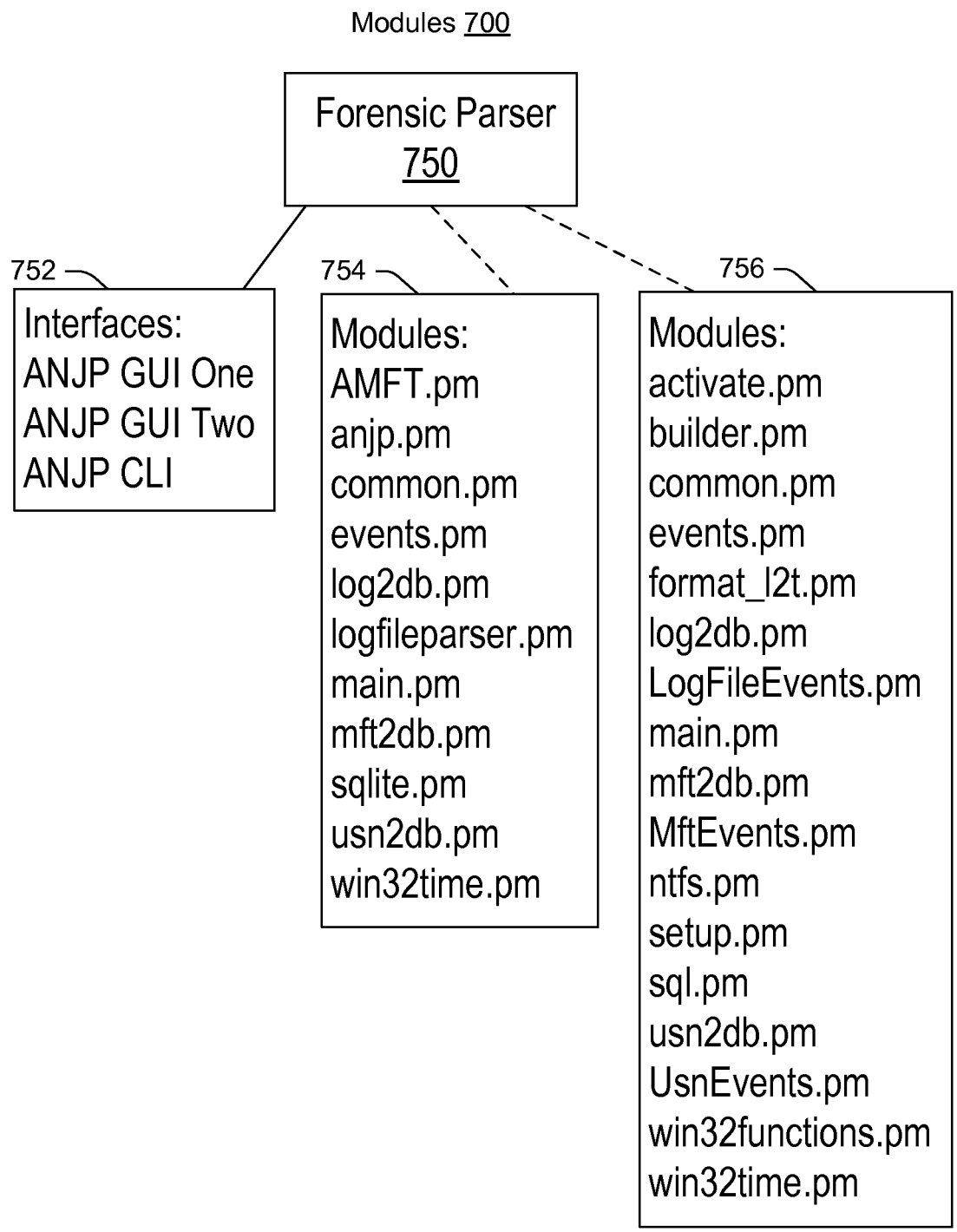
FIG. 7 is a diagram of an example of a forensic parser and examples of modules.

FIG. 7 shows examples of modules 700. As shown, the modules 700 can include a forensic parser module 750, Interfaces 752 (e.g., interface modules) ANJP GUI One, ANJP GUI Two, and ANJP CLI; and processing modules 754 and/or 756. The processing modules 754 are shown as including, for example, AMFT.pm, anjp.pm, common.pm, events.pm, log 2db.pm, logfileparser.pm, main.pm, mft2db.pm, sqlite.pm, usn2db.pm, and win32time.pm. The processing modules 756 are shown as including, for example, activate.pm, builder.pm, common.pm, events.pm, format_l2t.pm, log 2db.pm, LogFileEvents.pm, main.pm, mft2db.pm, MftEvents.pm, ntfs.pm, setup.pm, sql.pm, usn2db.pm, UsnEvents.pm, win32functions.pm, and win32time.pm. As mentioned, an example forensic parser was implemented in various trials and referred to as an Advanced NTFS Journal Parser (ANJP). Such a parser included various modules such as the modules 700.

Figure 8:
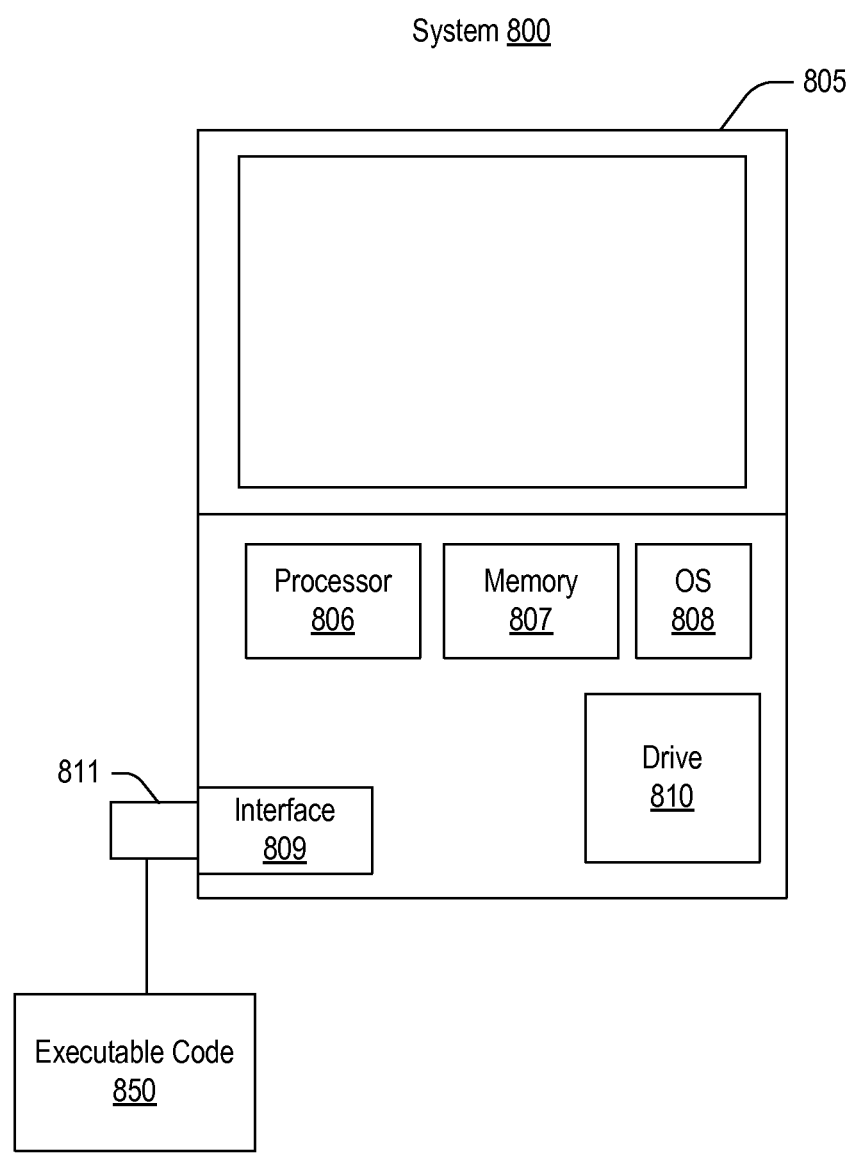
FIG. 8 is a diagram of an example of a system that can include a portable drive and a computing device that includes at least one drive.

FIG. 8 shows an example of a system 800 that includes a computing system (e.g., an IHS) 805 that includes a processor 806, memory 807 operatively coupled to the processor 806, an operating system 808 (e.g., instructions stored in memory), an interface 809 and a drive 810. As shown, a portable drive 811 (e.g., a USB drive, SD card, etc.) may include executable code 850 for performing forensic parser operations. In such an example, the portable drive 811 may be operatively coupled to the computing system 805 and perform various operations to generate output, which may, for example, be stored to the portable drive 811 (e.g., for analysis, viewing, etc. optionally using another system).

Figure 9:
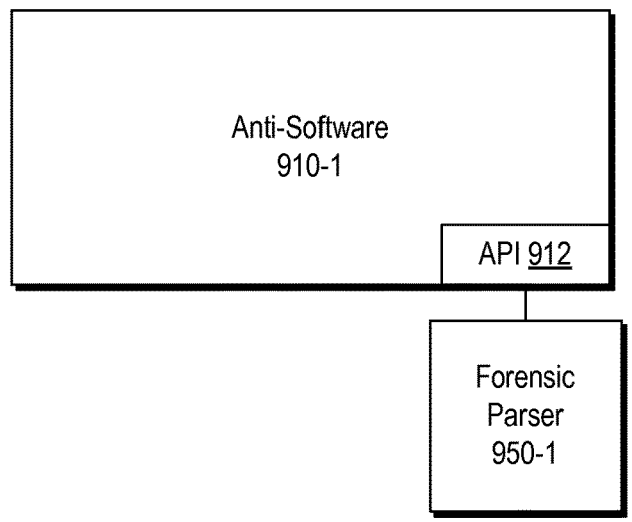
FIG. 9 is a diagram of an example of a system that can include a forensic parser module as part of an anti-software (e.g., anti-virus, anti-malware, etc.)
Figure 9:
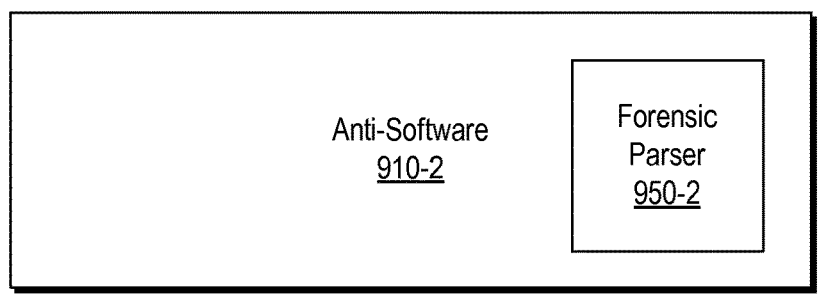
Figure 9:
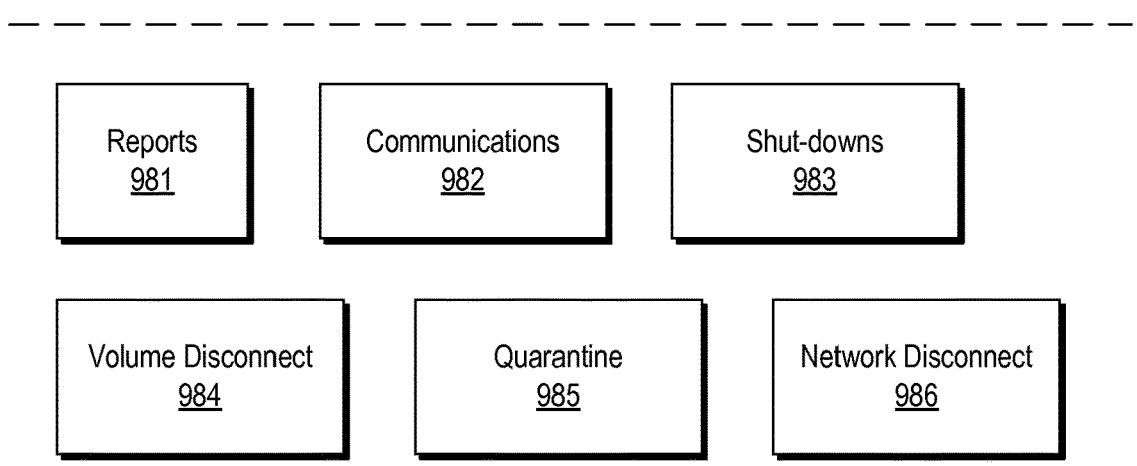

FIG. 9 shows an example of a system 900 that includes an anti-software application 910-1 that includes an application programming interface 912 (API) accessible by a forensic parser application 950-1 (e.g., to make API calls, to receive API calls, etc.) and an anti-software application 910-2 that includes a forensic parser module 950-2 (e.g., integral code). As an example, an anti-software may be one or more of an anti-virus software, an anti-malware software, etc. As an example, such an arrangement may provide output and/or perform actions such as reporting 981, communicating 982, shutting-down one or more components of an HIS 983, disconnecting a volume 984, quarantining 985 (e.g., isolating a volume), disconnecting a network connection 986, etc.

As an example, a forensic parser may include processing information as to one or more email applications, for example, to associate attachments with emails, an email application, etc. For example, a forensic parser may provide for OUTLOOK® email application identification of attachment access.

As an example, a forensic parser may determine when external devices have been written to (e.g., by active monitoring of one or more of a MFT, a change journal, a logfile, etc.). As an example, an alert may be issued as to writing to an external device (e.g., an email alert, a network message, a log entry, etc.).

As an example, a forensic parser may be installed on a machine that may report to a monitoring application (e.g., via a network, wired and/or wireless). For example, an IT manager may have a monitoring application that monitors output from individual machines that include forensic parser functionality installed thereon. As an example, individual machines may include an application that transmits one or more of a MFT, a change journal, a logfile, etc. to a monitoring application (e.g., for analysis by the monitoring application). As an example, an application may analysis timing of events, output a timeline, assess time stamp modifications, etc. As an example, a malicious operation may include modification of a time stamp in an effort to "hide" such an operation (e.g., to place it in a different time).

As an example, a forensic parser or one or more modules thereof may operate in conjunction with, receive information from, transmit information to, etc. another application or module of another application. As an example, an application or module (e.g., class, etc.) may be a file watcher application or module.

As an example, a class may be a FileSystemWatcher class, for example, that "watches" for changes in a specified directory. For example, such a module may watch for changes in files and subdirectories of the specified directory.

Such a module may provide for creation of a component to watch files on a local computer, a network drive, or a remote computer.

As an example, to watch for changes in files, a Filter property may be set to an empty string (" ") or one may use wildcards ("*.*"). To watch a specific file, it may be possible to set the Filter property to the file name. For example, to watch for changes in the file MyDoc.txt, set the Filter property to "MyDoc.txt". As an example, watching may be for changes in a certain type of file. For example, to watch for changes in text files, one may set the Filter property to "*.txt".

Some examples of types of changes may be "watched" may include Attributes, the LastWrite date and time, or the Size of files or directories (e.g., setting the NotifyFilter property to one of the NotifyFilters values).

As an example, a watcher component may watch for renaming, deletion, or creation of files or directories. For example, to watch for renaming of text files, one may set a Filter property to "*.txt" and call a WaitForChanged method with a Renamed specified for its parameter.

Various WINDOWS® OSes may notify an application, a module, etc. of file changes, for example, in a buffer created by a FileSystemWatcher class, etc. As an example, if there are many changes in a short time, the buffer may overflow (e.g., depending on size), which may cause the component to lose track of changes in the directory. Increasing the size of the buffer with a InternalBufferSize property may be expensive, as it may come from non-paged memory that may not be possible to swap out to disk. To avoid a buffer overflow, one may implement a NotifyFilter and, for example, IncludeSubdirectories properties, for example, to filter out unwanted change notifications.

As an example, a file watcher and a forensic parser may operate in conjunction with each other. A file watcher may trigger a forensic parser, a forensic parser may instruct a file watcher, etc. An application may be an active watcher and reporter, for example, that may include reporting activities that may be suspicious of erasures, malware, writing to one or more external drives, writing to a removable drive (e.g., a portable drive), writing to a removable medium, etc. While a particular type of file watcher is mentioned, other types of file watchers or functionality of "file watching" (e.g., watching of files, a volume, a file system, a file system manager, a port, etc.) may be implemented.

Figure 10:
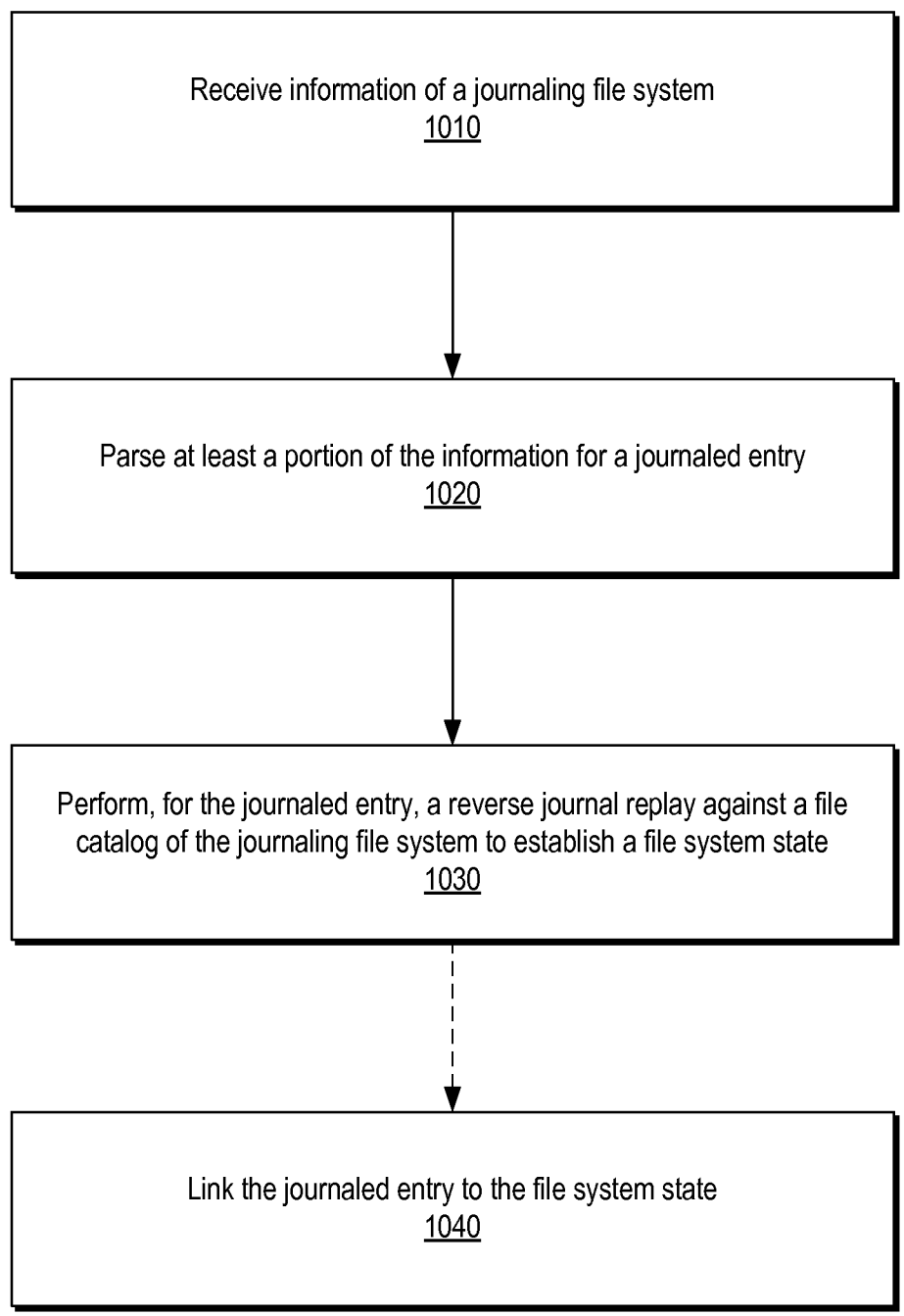
FIG. 10 is a diagram of an example of a method.

FIG. 10 shows an example of a method 1000 that includes a reception block 1010 for receiving information of a journaling file system; a parse block 1020 for parsing at least a portion of the information for a journaled entry; and a performance block 1030 for performing, for the journaled entry, a reverse journal replay with respect to a file catalog of the journaling file system to establish a file system state. In such an example, the method 1000 may include a link block 1040 for linking the journaled entry to the file system state.

In the method 1000, a journaling file system can be a file system that keeps track of the changes that will be made in a journal (e.g., a log in a dedicated area of the file system) before committing them to a main file system.

As an example, information of a journaling file system can include journaled information. As an example, journaled information may pertain to one or more operations with respect to non-volatile memory, which may be a hard drive, a solid-state drive, a removable storage medium, etc. As to operations, for example, consider a read operation, a write operation, an erase operation. As an example, non-volatile memory may be local or remote.

As an example, a journaling file system may include information associated with an erase operation (e.g., a delete operation) for a file where the operation includes removing a journaled directory entry for the file and marking space for the file and its inode as free in a free space map (e.g., for a UNIX® file system).

As an example, an NTFS journaling file system can include information such as, for example, the information listed in Table 1 below.

| System File | File Name | MFTRecord | Description |
| --- | --- | --- | --- |
| Master file table | $Mft | 0 | Contains one base file record for each file and folder on an NTFS volume. If the allocation information for a file or folder is too large to fit within a single record, other file records are allocated as well. |
| Master file table mirror | $MftMirr | 1 | Guarantees access to the MFT in case of a single-sector failure. It is a duplicate image of the first four records of the MFT. |
| Log file | $LogFile | 2 | Contains information used by NTFS for faster recoverability. The log file is used by WINDOWS® Server 2003 to restore metadata consistency to NTFS after a system failure. The size of the log file depends on the size of the volume, but you can increase the size of the log file by using the Chkdsk command. |
| Volume | $Volume | 3 | Contains information about the volume, such as the volume label and the volume version. |
| Attribute definitions | $AttrDef | 4 | Lists attribute names, numbers, and descriptions. |
| Root file name index | . | 5 | The root folder. |
| Cluster bitmap | $Bitmap | 6 | Represents the volume by showing free and unused clusters. |
|  |  |  | Boot sector |
| Bad cluster file | $BadClus | 8 | Contains bad clusters for a volume. |
| Security file | $Secure | 9 | Contains unique security descriptors for all files within a volume. |
| Upcase table | $Upcase | 10 | Converts lowercase characters to matching Unicode uppercase characters. |
| NTFS extension file | $Extend | 11 | Used for various optional extensions such as quotas, reparse point data, and object identifiers. |
|  |  | 12-15 | Reserved for future use. |

As a journaling file system, NTFS implements a master file table (MFT) that can include a base file record for each file and folder on an NTFS volume; noting that, if allocation information for a file or folder is too large to fit within a single record, one or more other file records may be allocated.

The NTFS also implements a log file ($LogFile) to record metadata changes to a volume. NTFS can also implement a USN Journal, for example, as a system management feature that can record changes to files, streams and directories on the volume, as well as their various attributes and security settings. The USN Journal may be made available to applications to track changes to a volume; noting that the USN Journal may be enabled or disabled on non-system volumes and may not enabled by default for a newly added drive.

As to $MFT entry attributes, consider the following examples: 0x10 Standard Information (includes information such as time stamp and link count); 0x20 Attribute List (lists the location of all the attribute records that do not fit in the MFT record); 0x30 File Name (a repeatable attribute for both long and short file names. The long name of the file can be up to 255 Unicode characters. The short name is the MS-DOS-readable, 8.3, case-insensitive name for the file. Additional names, or hard links, required by POSIX can be included as additional file name attributes); 0x40 Object ID (a volume-unique file identifier. Used by the link tracking service. Not all files have object identifiers); 0x50 Security Descriptor (shows information about who owns the file and who can access the file); 0x60 Volume Name (used only in the $Volume system file. Contains the volume label); 0x70 Volume Information (used only in the $Volume system file. Contains the volume version); 0x80 Data (contains file data. NTFS allows multiple data attributes per file. Each file typically has one unnamed data attribute. A file can also have one or more named data attributes, each using a particular syntax); 0x90 Index Root (used to implement folders and other indexes); 0xA0 Index Allocation (used to implement folders and other indexes); 0xB0 Bitmap (used to implement folders and other indexes); 0xC0 Reparse Point (used for directory junction points and volume mount points. They are also used by file system filter drivers to mark certain files as special to that driver); and 0x100 Logged Tool Stream (similar to a data stream, but operations on a logged tool stream are logged to the NTFS log file just like NTFS metadata changes. Used by EFS).

As an example, a method can include receiving information of a journaling file system where, for an NTFS journaling file system, such information can include one or more of MFT information, LogFile information and USN Journal information. As an example, a method may include receiving attribute information.

As an example, a method can include associating structures of two or more of a MFT, a LogFile and a USN Journal. In such an example, artifacts may be placed in one or more contexts.

As an example, a MFT can be associated with one or more USN Journal records via the aforementioned files Standard Information Attribute (ID: 0x10), which can include information such as time stamp and link count.

As an example, one or more USN Journal records can be associated to an MFT entry by one or more corresponding file record/reference numbers.

As to a LogFile and MFT, there are a number of operation records within a LogFile that may be used for association to a MFT. For example, consider a record header of a LogFile record, which may point to an MFT entry receiving a stored change depending on an operation type. Various data structures may be found within LogFile records that include a MFT record/reference number which points back to a specific an MFT entry.

As an example, one or more LogFile records can also be associated to a USN Journal, for example, when the Standard Information Attribute (ID: 0x10, e.g., time stamp and/or link count) update records are created. In such an example, the LogFile record will contain the USN number that links to its USN Journal record. The MFT Entry header also has a LSN (LogFile Sequence Number) that can be used to associate it to a LogFile record.

Some particular examples of associating are presented below for MFT/USN Journal; MFT/LogFile; and LogFile/USN Journal.

Associating MFT and USN Journal

A MFT includes information about a file (metadata). A USN Journal is a file that records the states of a given file. An association between MFT/USN Journal can reveal what has happened to a given file found in the MFT. USN Journal records include the filename of the given file in a record. However, it does not include the path. By associating to the MFT, a folder structure of the file's path can be created where a file's path can facilitate signature searching. While an association between MFT/USN Journal can help build a path, additional information helps to maintain the path (e.g., via a USN Journal rollback). As an example, a method can include associating MFT information and USN Journal information and performing a USN Journal rollback.

Associating MFT and LogFile

A LogFile can record file system structure changes. As an example, a method can include parsing a LogFile and associating one or more LogFile records to a MFT (e.g., MFT information) to determine a history of a given file. Such an association may reveal what has happened to a given file found in the MFT. A LogFile includes the filename of a given file in a record, however, as with a USN Journal, a LogFile does not include the path. By associating LogFile records to a MFT, a method can include building a folder structure of a record's file path. As mentioned, a file's path can facilitate signature searching. While an association between MFT/LogFile can help build a path, additional information helps to maintain the path (e.g., via a LogFile rollback). As an example, a method can include associating MFT information and LogFile information and performing a LogFile rollback.

Associating LogFile and USN Journal

As an example, a method can include associating a LogFile and a USN Journal, for example, via LogFile records that include Standard Information Attribute (ID: 0x10) structure changes with a USN number. For example, a USN number can be used for association to an appropriate record in a USN Journal. In such an example, the attribute change (e.g., ID: 0x10 information) may be placed into context of why it was updated via a reason that may be found within its USN record. In this example, such an association depends on a USN Journal being parsed before a LogFile.

As mentioned, a method can include performing a rollback, which may be a reverse journal replay. For example, in a journaling file system a "play" occurs responsive to an operation where one or more informational changes occur due to the play. In such an example, a file system may be defined as having a state prior to the play and a state after the play. A rollback may be viewed as starting with the state after the play and recreating the state prior to the play. Such a technique may be referred to as a reverse journal replay.

USN Journal Rollback

As an example, by associating a USN Journal to a MFT, a file path for a given file within a USN Journal record can be enumerated. However, this association cannot be used to maintain such a path while parsing the journal because files can be deleted and created using the same MFT entry record numbers. Thus, as an example, to maintain correct path names, a method can include performing a rollback of the USN Journal. For example, consider a method that includes parsing a USN Journal from newest to oldest records and applying changes to paths as files are renamed, deleted and/or created. Such an approach can act to retain correct paths for file names. As an example, a method may include maintaining path names and searching for signatures in a USN Journal.

LogFile Rollback

By associating a LogFile and MFT, a file path for a given file within a LogFile record can be enumerated. However, this association cannot be used to maintain a path while parsing an entire LogFile because files can be deleted and created using the same MFT entry record numbers. Thus, as an example, to maintain correct path names, a method can include performing a rollback of the LogFile. For example, consider a method that includes parsing a LogFile from newest to oldest records and applying changes to paths as files are renamed, deleted and/or created. Such an approach can act to retain correct paths for file names. As an example, a method may include maintaining path names and searching for signatures in a LogFile.

Figure 11:
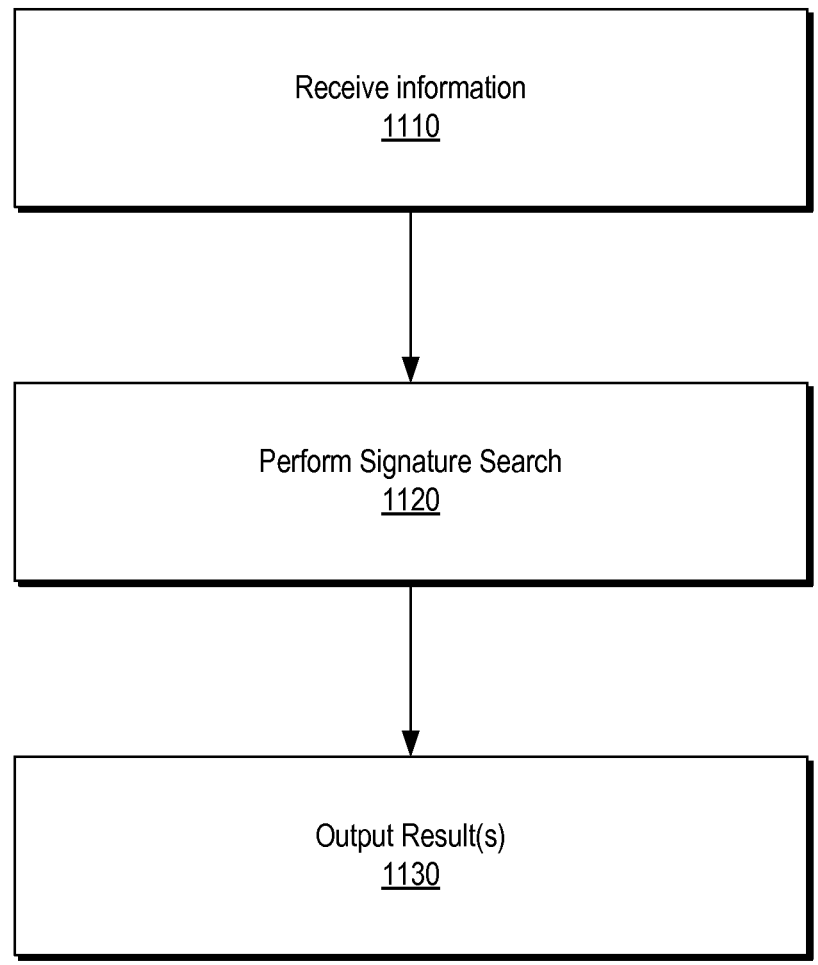
FIG. 11 is a diagram of an example of a method.

FIG. 11 shows an example of a method 1100 that includes a reception block 1110 for receiving information, a performance block 1120 for performing a signature search and an output block 1130 for outputting one or more results of the signature search. In such an example, the reception block 1110 may include receiving information output form a method such as the method 1000, which may be performed, at least in part, repeatedly, optionally in serial or parallel. For example, the performance block 1030 of the method 1000 may be repeated many times (e.g., possibly more than 100,000 times). In such an example, links of entries and file system states may be established. Such information may be received by the method 1100 where, for example, such information facilitates performance of one or more signature searches.

Signature searching in a USN Journal refers to being able to look for one or more known record patterns and/or sequences within the USN Journal that represent a known type of event or events. Though a method may include parsing and searching a USN Journal without association to a MFT and rolling back the USN Journal, such a method, as explained above, can fail to provide full path name enumeration.

Signature searching in a LogFile refers to being able to look for one or more known record patterns and/or sequences within the LogFile that represents a known type of event or events. Though a method may include parsing and searching a LogFile without association to a MFT and rolling back the LogFile, such a method, as explained above, can fail to provide full path name enumeration. As an example, as multiple types of records can exist in a LogFile, a rollback process makes it possible to enumerate one or more structures such as, for example, attribute positions and updates. Such an approach can add value as to what signatures are able to be searched.

Figure 12:
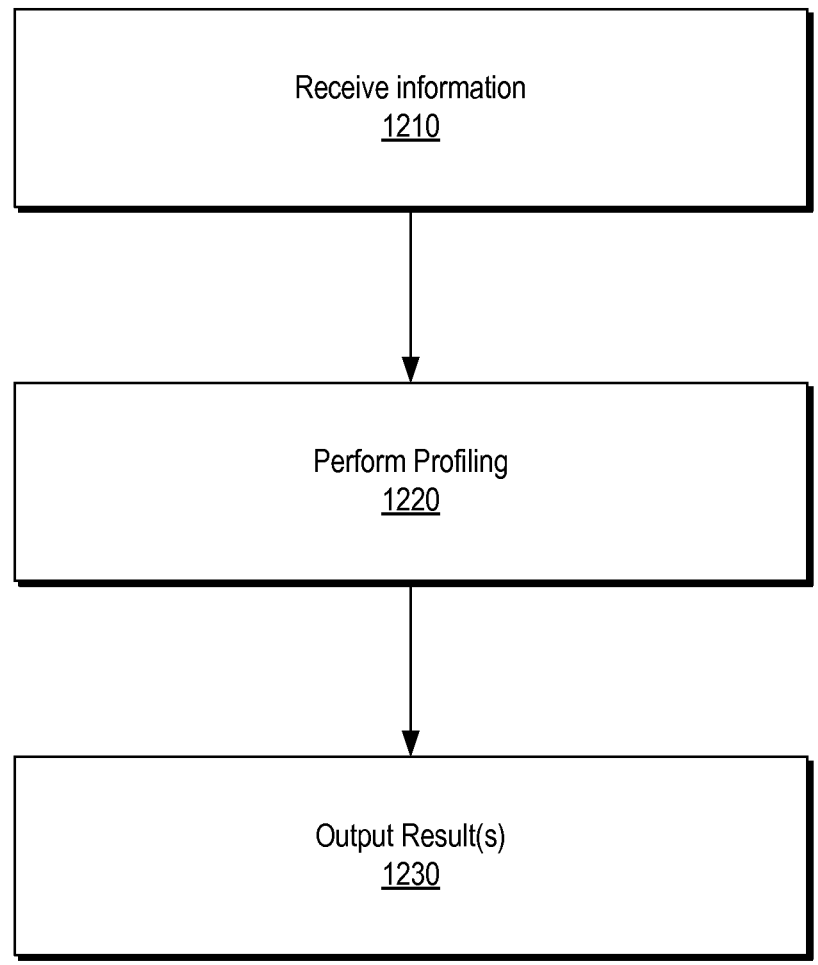
FIG. 12 is a diagram of an example of a method.

FIG. 12 shows an example of a method 1200 that includes a reception block 1210 for receiving information, a performance block 1220 for performing profiling and an output block 1230 for outputting one or more results of the profiling. In such an example, the reception block 1210 may include receiving information output form a method such as the method 1100, which may be performed, at least in part, repeatedly, optionally in serial or parallel.

As to the performance block 1220, profiling can include identifying a signature that may be specific to a given event as a result of user, application, or system activity. Such a signature may be quite specific, optionally unique. As an example, a method can include performing a rollback of one or more journal data structures (e.g., LogFile and/or USN Journal) to facilitate profiling. For example, consider an application that may be periodically launched (e.g., intentionally and/or unintentionally by a user). In such an example, every time the application is launched, the creation of a file may be found with a USN Journal and a LogFile with a name of "action.temp" in a specific path of "User\Temp" and, after the file is created, the system file "explore.exe" has data appended to it. After the data is appended, the action.temp file is renamed to spreadsheet.xlsx and moved to another folder called Documents. Consider the following as a representation of that profile without rolling back the LogFile or USN Journal:

| | |
|---|---|
| action.temp | File creation |
| explore.exe | Data append |
| action.temp -> spreadsheet.xml | File Rename |

Now, consider an example where the LogFile and the USN Journal can be rolled back:

| | |
|---|---|
| User\Temp\action.temp | File Creation |
| Windows\explore.exe | Data append |
| User\Temp\action.temp -> Documents\spreadsheetxml | File Rename |

Where, for example, many applications create a file called action.temp, as illustrated above, only a specific application may create a file with such a name in a User\Temp directory (i.e., an enumerated path). Thus, a method can include rolling back a LogFile and a USN Journal to create one or more profiles that may be of greater certainty (e.g., accuracy) that can reduce chances of false positives.

As an example, a method can include increasing the speed of event searching. For example, as contents of LogFile records change depending upon operation of the change, rows storing the changes can be stored in hash form and keyed based on the operation. For example, consider the following as to how current operations may be stored:

'0200'=>['chg_name','chg_lsn']
'0300'=>['chg_name','chg_lsn']
'0500'=>['chg_name','chg_attrib_changes','chg_lsn']
'0600'=>['chg_name','chg_attrib_changes','chg_lsn']
'0700'=>['chg_name','chg_attrib_changes','chg_lsn', 'chg_data','sia_logopp']

In such an example, the information may be readily checked for signatures without having to recourse through each record of a LogFile. For example, where a profile of a particular action starts with updating a specific file (e.g., "test.txt") by extending data, this action can be searched by looking at the 0700 class of operations, for an attribute change of the Data Attribute. An operation of the 0700 class on a file named "test.txt" could exist, however, depending if there are only actions preformed on the Standard Information Attribute (e.g., ID: 0x10), it can be determined if the signature will exist or not. Such an approach can be quicker and more efficient than iterating through every LogFile record searching for a given operational change, when it might or might not exist.

As an example, a method may include implementing one or more custom rules. For example, consider use of an advanced searching method that can give way to customization of rule sets to detect profiles by the user. As an example, consider the following of how a user can create custom rule sets to detect profiled events:

```
<?xml version="1.0" encoding="us-ascii"?>
<definitions>
<logfile>
<event id='file created' type='change' use='1'>
<signature>
<operation redo='0200' undo='0000'>
<key column='chg_name' value='.{1,}' type='regex'></key>
<condition attribute='fna_flags_s' condition='not contains' value='Directory'></condition>
</operation>
</signature>
</event>
</logfile>
</definitions>
```

As an example, a method can include rolling back a data structure as to states and searching in a manner that allows for the detection of several situations such as, for example, detection of known bad actions, detection of known application of events, detection of alternate operating systems writing to the disk, and detection of alternate file system drivers writing to a disk.

Figure 13:
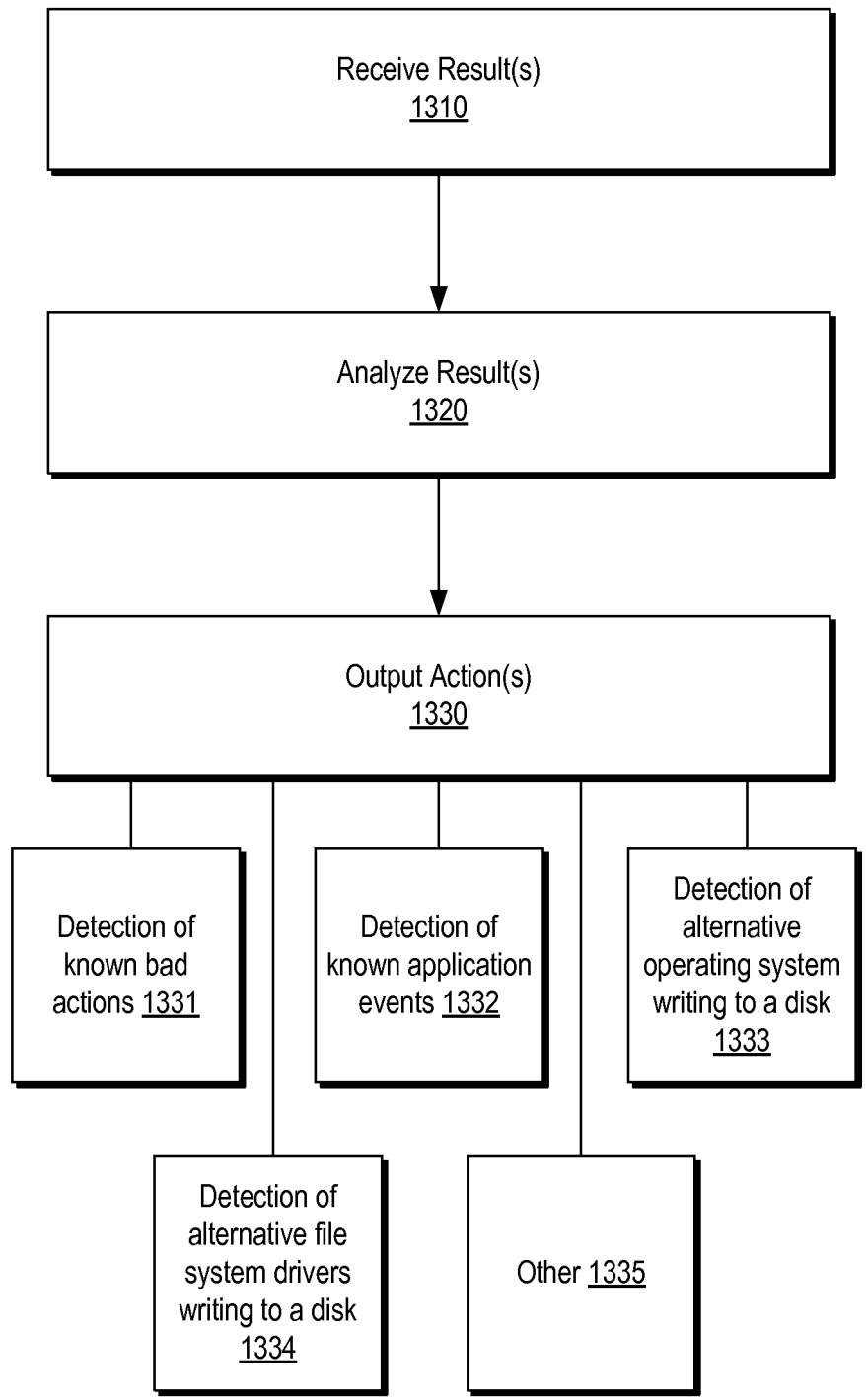
FIG. 13 is a diagram of an example of a method.

FIG. 13 shows an example of a method 1300 that includes a reception block 1310 for receiving one or more results (e.g., of a method such as the method 1000, 1100, and/or 1200), an analysis block 1320 for analyzing at least a portion of the received one or more results and an output block 1330 for outputting one or more actions based at least in part on the analysis. For example, the output block 1330 may include output information as to detection of one or more known bad actions 1331, as to detection of one or more know application events 1332, as to detection of one or more alternative operating systems writing to a disk (e.g., or other medium) 1333, as to detection of one or more alternative file system drivers writing to a disk (e.g., or other medium) 1334 and/or as to one or more other actions 1335.

FIG. 14 shows an example of a USN change journal record 1410, for example, as a data structure. As shown, the USN record 1410 includes various fields. As to syntax, in the C # programming language, a structure may be defined as follows:

```
typedef struct {
    DWORD           RecordLength;
    WORD            MajorVersion;
    WORD            MinorVersion;
    DWORDLONG       FileReferenceNumber;
    DWORDLONG       ParentFileReferenceNumber;
    USN             Usn;
    LARGE_INTEGER   TimeStamp;
    DWORD           Reason;
    DWORD           SourceInfo;
    DWORD           SecurityId;
    DWORD           FileAttributes;
    WORD            FileNameLength;
    WORD            FileNameOffset;
    WCHAR           FileName[1];
} USN_RECORD_V2, *PUSN_RECORD_V2, USN_RECORD,
*PUSN_RECORD;
```

The foregoing data structure includes information for an update sequence number (USN) change journal record (e.g., a Microsoft version 2.0 record; noting that prior or later versions may include at least some of the information of the foregoing data structure).

As an example, a file reference number may be the ordinal number of a file or directory for which a record notes changes. Such a number may be an arbitrarily assigned value that associates a journal record with a file.

As to reason, this can include a flag that may be a code that identifies one or more reasons for changes that have accumulated in a file or directory journal record since the file or directory opened.

As an example, when a file or directory closes, a final USN record can be generated with the USN_REASON_CLOSE flag set. In such an example, the next change (e.g., after the next open operation or deletion) starts a new record with a new set of reason flags.

As an example, a rename or move operation generates two USN records, one that records the old parent directory for the item, and one that records a new parent.

As an example, a reason flag may include one or more of the following:

USN_REASON_BASIC_INFO_CHANGE (0x00008000)
A user has either changed one or more file or directory attributes (for example, the read-only, hidden, system, archive, or sparse attribute), or one or more time stamps.
USN_REASON_CLOSE (0x80000000)
The file or directory is closed.
USN_REASON_COMPRESSION_CHANGE (0x00020000)
The compression state of the file or directory is changed from or to compressed.
USN_REASON_DATA_EXTEND (0x00000002)
The file or directory is extended (added to).
USN_REASON_DATA_OVERWRITE (0x00000001)
The data in the file or directory is overwritten.
USN_REASON_DATA_TRUNCATION (0x00000004)
The file or directory is truncated.
USN_REASON_EA_CHANGE (0x00000400)
The user made a change to the extended attributes of a file or directory (these NTFS file system attributes are not accessible to WINDOWS®-based applications).
USN_REASON_ENCRYPTION_CHANGE (0x00040000)
The file or directory is encrypted or decrypted.
USN_REASON_FILE_CREATE (0x00000100)
The file or directory is created for the first time.
USN_REASON_FILE_DELETE (0x00000200)
The file or directory is deleted.
USN_REASON_HARD_LINK_CHANGE (0x00010000)
An NTFS file system hard link is added to or removed from the file or directory (e.g., an NTFS file system hard link is one of several directory entries that see the same file or directory).
USN_REASON_INDEXABLE_CHANGE (0x00004000)
A user changes the FILE_ATTRIBUTE_NOT_CONTENT_INDEXED attribute. For example, a user changes the file or directory from one where content can be indexed to one where content cannot be indexed, or vice versa. Content indexing can permit more rapid searching of data by building a database of selected content.
USN_REASON_NAMED_DATA_EXTEND (0x00000020)
The one or more named data streams for a file are extended (added to).

USN_REASON_NAMED_DATA_OVERWRITE
  (0x00000010)
The data in one or more named data streams for a file is overwritten.
USN_REASON_NAMED_DATA_TRUNCATION
  (0x00000040)
The one or more named data streams for a file is truncated.
USN_REASON_OBJECT_ID_CHANGE (0x00080000)
The object identifier of a file or directory is changed.
USN_REASON_RENAME_NEW_NAME
  (0x00002000)
A file or directory is renamed, and the file name in the USN_RECORD_V2 structure is the new name.
USN_REASON_RENAME_OLD_NAME
  (0x00001000)
The file or directory is renamed, and the file name in the USN_RECORD_V2 structure is the previous name.
USN_REASON_REPARSE_POINT_CHANGE
  (0x00100000)
The reparse point that is contained in a file or directory is changed, or a reparse point is added to or deleted from a file or directory.
USN_REASON_SECURITY_CHANGE (0x00000800)
A change is made in the access rights to a file or directory.
USN_REASON_STREAM_CHANGE (0x00200000)
A named stream is added to or removed from a file, or a named stream is renamed.

Figure 15:
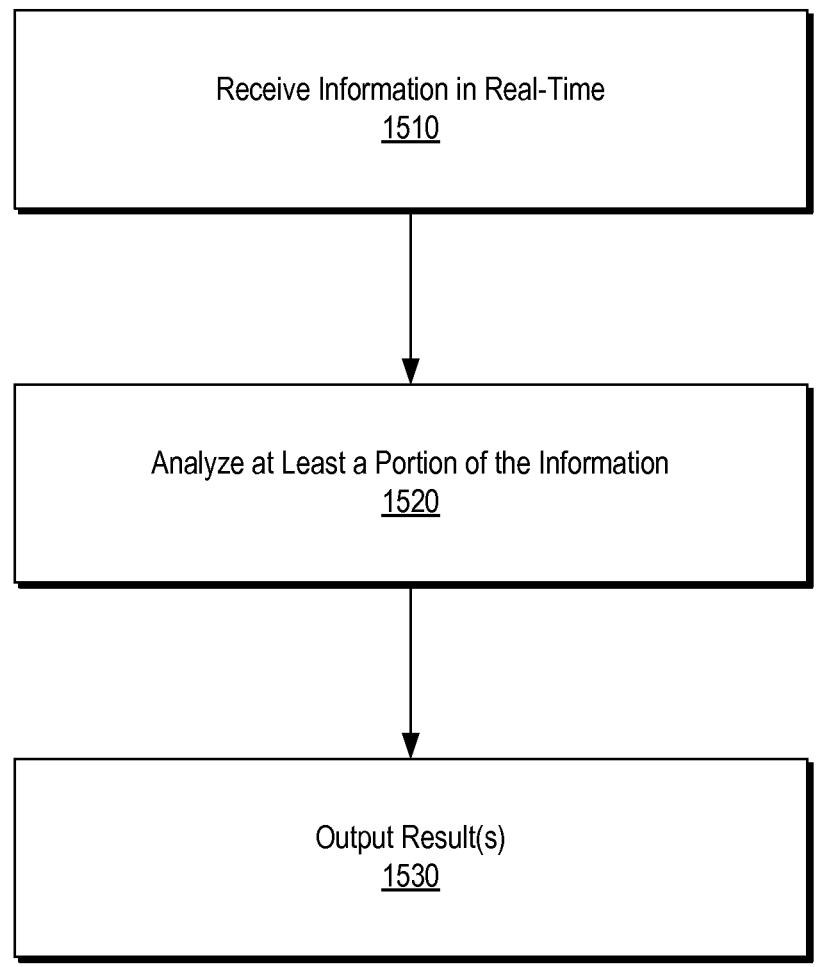
FIG. 15 is a diagram of an example of a method.

FIG. 15 shows an example of a method 1500 that includes a reception block 1510 for receiving information in real-time (e.g., real-time capture of changes from $LogFile, $USN Journal, etc.), an analysis block 1520 for analyzing at least a portion of the information and an output block 1530 for outputting one or more results based at least in part on an analysis. In such an example, the analysis block 1520 can include signature based analysis.

As an example, a method can include real-time capture of changes from $Txf and/or $Txr and, for example, signature based detection of changes based on $Txf and/or $Txr changes, optionally combined with one or more other journals.

As an example, a method can include real-time capture of changes from a Resilient File System (ReFS), which can be a new local file system. As an example, a ReFS may aim to maximize data availability, despite errors that may historically cause data loss or downtime. ReFS can act to promote data integrity (e.g., protection from errors and available when needed).

Features of ReFS can include, if corruption occurs, detection and, when configured with Storage Spaces, automatically correct the corruption. In the event of a system error, ReFS may aim to recover from that error rapidly, with no loss of user data. As an example, ReFS may support a subset of NTFS features (e.g., plus Win32 APIs). As an example, a ReFS may support a data integrity scanner (e.g., a "scrubber") that periodically scans the volume, attempts to identify latent corruption, and then proactively triggers a repair of that corrupt data.

As an example, a method can include receiving information and analyzing the information to output one or more results germane to operation of a ReFS, optionally including actions of a data integrity scanner (e.g., a scrubber).

As an example, a method may include receiving information of a HFS+ file system (Apple Inc., Cupertino, Calif.). HFS+ can be a primary file system of an operating system such as OS X (Apple, Inc.).

Where the HFS+ file system journaling is enabled, for example, for a drive, a continuous record of changes to files on the drive may be maintained in a journal. For example, if a computer stops because of a power failure or some other issue, the journal may be referenced to restore the drive to a known-good state upon restart. With journaling enabled, the file system logs transactions as they occur. As an example, if a server fails in the middle of an operation, the file system can "replay" the information in its log and complete the operation when the server restarts. For example, a forward "replay" can occur based on the information in a journal.

HFS+ (e.g., Hierarchical File System (HFS) Plus) finds use in various computing devices such as, for example, the IPOD™ digital music player.

HFS+ volumes are divided into sectors (called logical blocks in HFS). These sectors are then grouped together into allocation blocks which can include one or more sectors.

As an example, a HFS+ volume may include data structures such as: Sectors 0 and 1 as boot blocks; Sector 2 as a Volume Header that stores a variety of data about the volume itself, for example the size of allocation blocks, a timestamp that indicates when the volume was created or the location of other volume structures such as the Catalog File or Extent Overflow File; an Allocation File that keeps track of which allocation blocks are free and which are in use; a Catalog File that is a B-tree that contains records for files and directories stored in the volume; an Extents Overflow File as another B-tree that records the allocation blocks that are allocated to each file as extents (e.g., each file record in the Catalog File being capable of recording eight extents for each fork of a file; once those are used additional extents may be recorded in the Extents Overflow File); an Attributes File as a B-tree form that can store different types of records (e.g., Inline Data Attribute records, Fork Data Attribute records and Extension Attribute records); a Startup File (e.g., for non-MAC™ OS systems lacking HFS or HFS Plus support); an Alternate Volume Header; and a reserved sector (e.g., used during a computer manufacturing process).

Figure 16:
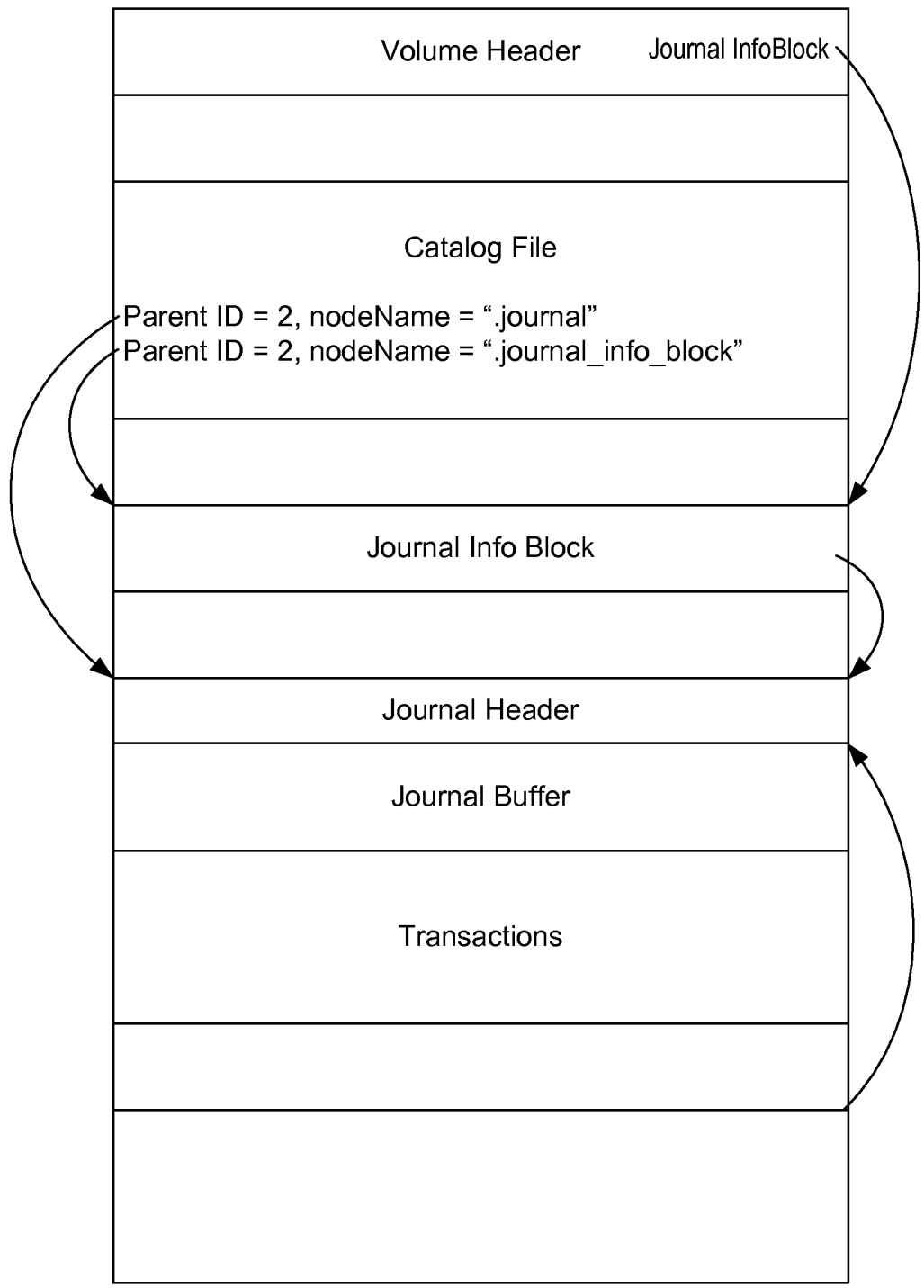
FIG. 16 is a diagram of an example of a data structure.

FIG. 16 shows an example of a journal 1610, for example, as in a HFS+ file system. Journal data structures include a journal info block, journal header, and journal buffer. The journal info block indicates the location and size of the journal header and journal buffer. The journal buffer is the space set aside to hold transactions. The journal header describes which part of the journal buffer is active and contains transactions waiting to be committed.

On HFS+ volumes, the journal info block is stored as a file (so that its space can be properly represented in a catalog record and the allocation bitmap). The name of that file is ".journal_info_block" and it is stored in the volume's root directory. The journal header and journal buffer are stored together in a different file named ".journal", also in the volume's root directory. Each of these files are contiguous on disk (they occupy exactly one extent). An implementation that uses the journal should prevent the files from being accessed as normal files.

As an example, the journal info block may be identified by using the journalInfoBlock field of the volume header (e.g., not by the file name). Similarly, the journal header and journal buffer may be found using the contents of the journal info block (e.g., not the file name).

As an example, a single transaction can involve several blocks, including both the data to be written, and the location where that data is to be written. Such a transaction may be represented on a drive by a block list header, which describes the number and sizes of the blocks, followed by the contents of those blocks.

As an example, a journal replay (forward replay) may be as follows for HFS+:
1. Read the volume header into variable vhb. The volume may have an HFS wrapper; if so, use it to determine the location of the volume header.
2. Test the kHFSVolumeJournaledBit in the attributes field of the volume header. If it is not set, there is no journal to replay.
3. Read the journal info block from the allocation block number vhb.journalInfoBlock, into variable jib.
4. If kJIJournalNeedsInitMask is set in jib.flags, the journal was never initialized, so there is no journal to replay.
5. Verify that kJIJournalInFSMask is set and kJIJournalOnOtherDeviceMask is clear in jib.flags.
6. Read the journal header at jib.offset bytes from the start of the volume, and place it in variable jhdr.
7. If jhdr.start equals jhdr.end, the journal does not have any transactions, so there is nothing to replay.
8. Set the current offset in the journal (typically a local variable) to the start of the journal buffer, jhdr.start.
9. While jhdr.start does not equal jhdr.end, perform the following steps:
    a. Read a block list header of jhdr.blhdr_size bytes from the current offset in the journal into variable blhdr.
    b. For each block in bhdr.binfo[1] to bhdr.binfo[blhdr.num_blocks], inclusive, copy bsize bytes from the current offset in the journal to sector bnum on the volume (to byte offset bnum*jdhr.jhdr_size). Remember that jhdr_size is the size of a sector, in bytes.
    c. If bhdr.binfo[0].next is zero, you have completed the last block list of the current transaction; set jhdr.start to the current offset in the journal.

As an example, a method can include HFS+ analysis, for example, using a linkage between the Catalog File, Journal and Volume Header. As an example, signatures of known actions based on Journal and Catalog changes in HFS+ may be used to search information, for example, to classify one or more actions.

As an example, a journaling file system may be an "ExtX" file system such as, for example, the Ext3 or Ext4 files systems. The Ext3, or third extended file system, is a journaled file system that may be used by a kernel such as a LINUX® kernel (e.g., a Unix-like operating system kernel).

Ext3 includes levels of journaling. For example, Ext3 can include a journal level, an ordered level and a writeback level. In the journal level, metadata and file contents are written to the journal before being committed to the main file system. As the journal may be relatively continuous on a drive, this may improve performance (e.g., given sufficient journal). However, performance may worsen as data is written twice (e.g., once to the journal and once to the main part of the file system).

For the ordered level, only metadata is journaled (e.g., file contents are not journaled); however, file contents are to be written to a drive before associated metadata is marked as committed in the journal. The ordered level may be a default for a Linux implementation. As an example, if there is a power outage or kernel panic while a file is being written or appended to, the journal will indicate that the new file or appended data has not been "committed", so it may be purged by a cleanup process. However, files being overwritten can be corrupted because the original version of the file may not be stored. Thus, it is possible to end up with a file in an intermediate state between new and old, without enough information to restore either one or the other. An intermediate state might intersperse old and new data, because the order of the write is left up to a drive.

As to the writeback level, only metadata is journaled; file contents are not. The contents might be written before or after the journal is updated. As a result, for example, a file modified right before a crash may become corrupted. For example, a file being appended to may be marked in the journal as being larger than it actually is, which may cause garbage at the end.

As the three aforementioned Ext3 levels, the internal structure of the file system aims to be consistent, even after a crash. Data content of files or directories which were being modified when a system crashed can be affected; whereas, the rest is to be intact after recovery.

As to Ext4, extents replace the block mapping scheme used by Ext2 and Ext3. An extent is a range of contiguous physical blocks, which may improve large file performance and reduce fragmentation. For example, a single extent in Ext4 may map up to about 128 MiB of contiguous space with a 4 KiB block size. As an example, there may be four extents stored in an inode. In such an example, where there are more than four extents to a file, the rest of the extents may be indexed in an HTree (e.g., a specialized tree data structure for directory indexing, akin to a B-tree, that may include a constant depth of one or two levels, have a high fanout factor, use of a hash of a filename, etc.).

Ext4 can implement checksums in its journal, for example, to improve reliability as the journal may be one of the most used files of a drive. Such a feature can act to avoid a drive I/O wait during journaling, which may improve performance. When Ext3 appends to a file, it may call a block allocator, for example, once for each block. In such an example, there can be multiple concurrent writers and files may become fragmented on a drive. Ext4 can implement delayed allocation, which allows can allow for buffering data and allocating groups of blocks. Thus, a multiblock allocator may make better choices about allocating files contiguously on a drive. The multiblock allocator in Ext4 may be used when files are opened in an O_DIRECT mode.

Ext4 provides support for timestamps that may be measured in nanoseconds. Further, 2 bits of an expanded timestamp field may be added to the most significant bits of the seconds field of the timestamps, for example, to defer the year 2038 problem for an additional 204 years. Ext4 also provides support for date-created timestamps.

As to a Unix/LINUX® kernel implementation, ExtX involves blocks to store data (e.g., data files) and blocks to store file system metadata. Such metadata can describe structure(s) of a file system. For example, consider metadata as to superblocks, inodes and directories. A superblock can include information about file system such as: File system type, Size, Status and Information about other metadata structures. An ExtX implementation can include multiple redundant copies of superblocks, which may be suitable for backup and restore of a damaged primary superblock. As an example, the command that follows acts to display primary and backup superblock location on /dev/sda3: # dumpe2fs/dev/hda3|grep -i superblock. For example, consider the following output:
  Primary superblock at 0, Group descriptors at 1-1
  Backup superblock at 32768, Group descriptors at 32769-32769
  Backup superblock at 98304, Group descriptors at 98305-98305
  Backup superblock at 163840, Group descriptors at 163841-163841

Backup superblock at 229376, Group descriptors at 229377-229377

Backup superblock at 294912, Group descriptors at 294913-294913

As to inode, an inode pointer structure is a structure that has been adopted by the inode of a file in the Unix File System (UFS) to list the addresses of a file's data blocks. As mentioned, it also exists in the Ext3 file system (e.g., and other file systems). As an example, blocks of addresses (e.g., indirect blocks) may be allocated as needed. For example, a 12-block file may be described using just the inode because its blocks fit into the number of direct pointers available; however, a 13-block file needs an indirect block to contain the thirteenth address. The inode pointer structure allows for files to be allocated to non-contiguous blocks and allows the data at a particular location inside a file to be locatable (e.g., consider a fixed logical block size). As an example, consider a scenario where each block is 8 kB and where file data at 120 to 128 kB would be pointed to by the third pointer of a first indirect block (e.g., assuming twelve direct pointers in the inode pointer structure).

As to indirect blocks, unlike the inodes (e.g., fixed in number and allocated in a special part of the file system), they may be of any number and allocated in the same part of the file system as data blocks. The number of pointers in the indirect blocks can be dependent on the block size and size of block pointers. For example, with a 512 byte block size, and 4 byte block pointers, each indirect block may consist of 128 (512/4) pointers.

As an example, a file system such as an ExtX file system may be compatible with an APPLE® OS and/or a WINDOWS® OS. Ext2 and Ext3 may have stable drivers such as Ext2IFS that provide for use with various OSs. As an example, it may be possible to create a compatible Ext4 file system for use in a WINDOWS® OS environment by disabling the extents feature in Ext4 and, for example, specifying an inode size. Another option for using Ext4 in a WINDOWS® OS environment may be to use Ext2Fsd, an open-source driver that, like Ext2IFS, supports writing in Ext4 partitions where extents have been disabled. As an example, viewing and copying files from Ext4 to a WINDOWS® OS environment, even with extents enabled, may be possible with the Ext2Read software. The ExtFS for WINDOWS® may allow for read/write capabilities for Ext2, 3, and/or 4. As to APPLE® OSs, the Mac OS X includes ext2/3/4 read/write capability through ExtFS software; noting that software such as ext4fuse includes read-only support with limited functionality.

As an example, a method can include implementing an ExtX forensic analysis based at least in part on a linkage between the superblock, journal and group descriptors of the ExtX file system (e.g., consider Ext3, Ext4, etc.). As an example, a method can include generating a signature database. In such an example, the signature database can include signatures of known actions based on file system information such as, for example, journal and inode changes of an ExtX file system. As an example, a method can include correlating journal events to match a system to an external storage drive.

As mentioned, a journaling file system may be implemented in an effort to reduce risks of loss of information, loss of operability, etc. As an example, a journaling file system may log individual transactions as they occur. In such an example, a "failure" may prompt the file system to perform a "replay" from a past point in time in an effort to re-establish the file system to the point of the failure. For example, a file system may encounter an error and seek out a last "check point". From the last check point, the file system may perform a series of sequential replays based on journaled information from a time corresponding to the check point to a time of the encountered error (e.g., as a type of failure). Such an approach is forward in time—a forward replay. In such an example, where 1000 journaled events exist in a time span from the check point to the error, a replay replays the earliest of these events to establish a file system state, replays the next earliest of these events to establish another file system state, etc., to re-established the file system. Such an approach may be deemed "corrective" as it aims to correct for the occurrence of a failure.

As an example, a method can include performing a reverse replay. In such an example, a reverse replay starts at a point and "moves" backwards in time. Such an approach may be forensic. A forensic science approach may include gathering and examining information about the past (e.g., information of a journaling file system). As an example, a method can include performing one or more reverse replays based at least in part on a portion of information of a journaling file system. In such an example, one or more journaled entries may be used to establish (e.g., reconstruct) one or more past states of a file system. Past state information may pertain to files, file content, file operations, drives, applications, connections, etc. As an example, a drive may be local, remote, removable, etc. As an example, a drive may include one or more computer-readable media, which may be removable. As an example, a drive may be an optical drive, a bubble drive, a magnetic drive, a hard disk drive, a solid-state drive, a network drive, etc.

As an example, forensics may be performed on a device that implements a file system. As an example, a device may be a portable device (e.g., a smart phone, a tablet, etc.). As an example, a device may be a server. As an example, a device may be a notebook computer. As an example, a device may be a desktop computer. As an example, forensics may be performed on a system that includes one or more devices. As an example, forensics may be performed on a system and/or a device that includes and/or that can operatively couple to multiple drives.

Figure 17:
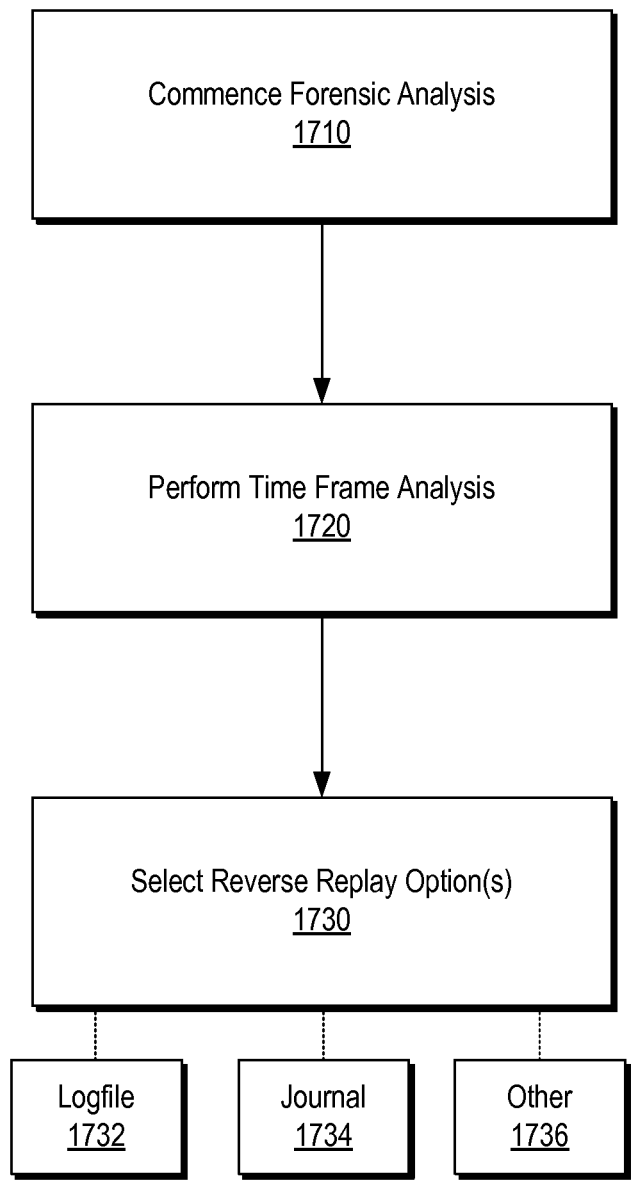
FIG. 17 is a diagram of an example of a method.

FIG. 17 shows an example of a method 1700 that includes a commencement block 1710 for commencing a forensic analysis, a performance block 1720 for performing a time frame analysis and a selection block 1730 for selecting one or more of a plurality of reverse replay options. For example, consider a logfile option 1732, a journal option 1734 and/or one or more other options 1736.

As an example a logfile may include detail over a time frame that is shorter than that of a journal. For example, in NTFS, the LogFile tends to include less overall data than the USN Journal. In the example of FIG. 17, the performance block 1720 may perform an analysis that may account for frequency and/or number of events. Such an analysis may aid in selection of a reverse replay option or options. As an example, for a WINDOWS® OS such as WINDOWS® 7, a NTFS can include a USN Journal that may be rolled back via a series of reverse replays for purposes of detecting deleted artifacts; noting that in such an example, the LogFile may not go back as far as it can overwrite itself.

As an example, a reverse replay may be against a file catalog (e.g., performed with respect to information stored in a file catalog). A file catalog may be a structure of a journaling file system that tracks files and metadata. For example, in NTFS, consider the MFT as a file catalog; in HFS+ consider the catalog; and in ExtX, consider superblock links to other blocks as file catalog information.

As an example, a method can include MFT parsing and folder structure creation. As an example, a method can include USN Journal parsing and linkage to information of a MFT. As an example, a method can include LogFile parsing and linkage to information in a MFT and to information in a USN Journal.

As an example, various actions of methods described herein may be implemented in part using equipment. As an example, consider equipment that includes a processor and memory accessible to the processor where instructions may be stored in the memory and executed by the processor. As an example, instructions may be stored in one or more computer-readable storage media (e.g., or machine-readable storage media) that are non-transitory and not carrier waves.

As an example, a method may include real-time detection of possible malware/bad actions based on one or more changes that match one or more known bad action patterns (e.g., and not signatures). As an example, a method can include detection of raw manipulations of file system attributes through statistical analysis.

As an example, a method can include receiving information of a journaling file system; parsing at least a portion of the information for a journaled entry; and, for the journaled entry, performing a reverse journal replay with respect to a file catalog of the journaling file system to establish a file system state. In such an example, the journaling file system may be a NTFS, a HFS+ or an ExtX file system.

As an example, in a method, information received can include master file information and log file information. As an example, a method can include enumerating a file path based at least in part on performing a reverse journal replay. As an example, a method can include linking a journaled entry and a file system state (e.g., as established via a reverse replay or reverse replays).

As an example, a method can include repeatedly parsing information for individual journaled entries and for at least two or more of the journaled entries, performing individual reverse journal replays with respect to a file catalog of a journaling file system to establish individual file system states.

As an example, a method can include receiving information associated with operation of an information handling system for a period of time greater than one day.

As an example, a method can include performing a reverse journal replay that includes a LogFile rollback, a USN Journal rollback, or a LogFile rollback and a USN Journal rollback.

As an example, a method can include, based at least in part on performing a reverse replay, detecting one or more operating systems writing to a non-volatile storage medium associated with a journaling file system. In such an example, the method may include detecting a primary operating system writing to a non-volatile storage medium and detecting an alternative operating system writing to the non-volatile storage medium.

As an example, a method can include, based at least in part on performing a reverse replay, detecting one or more file system drivers writing to a non-volatile storage medium associated with a journaling file system.

As an example, a method can include accessing information in a master file table, a change journal and a logfile; parsing the information; and identifying at least one action based at least in part on the parsing. In such an example, the at least one action may include one or more of an action performed by an eraser application, an action performed by malware, an action performed by a file transfer application, an action performed by a file burner application, etc.

As an example, one or more computer-readable storage media can include processor-executable instructions wherein the processor-executable instructions include instructions to: access information in a master file table, a change journal and a logfile; parse the information; and identify at least one action based at least in part on the parse of the information. Upon execution of the instructions, an information handling system may perform operations such as operations including: accessing information in a master file table, a change journal and a logfile; parsing the information; and identifying at least one action based at least in part on a parsing of the information.

As an example, a system can include a processor; memory accessible by the processor; an interface; and processor-executable instructions stored in the memory where the instructions include instructions to: receive information of a journaling file system; parse at least a portion of the information for a journaled entry; and, for the journaled entry, perform a reverse journal replay with respect to file catalog of the journaling file system to establish a file system state. Upon execution of the instructions, the system may perform operations such as operations including receiving information of a journaling file system; parsing at least a portion of the information for a journaled entry; and, for the journaled entry, performing a reverse journal replay with respect to file catalog of the journaling file system to establish a file system state.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   receiving information of a journaling file system associated with past operations of an information handling system with respect to a non-volatile storage medium;
   parsing at least a portion of the information for a journaled entry in a master file table of the journaling file system wherein the master file table tracks files stored in the non-volatile storage medium and metadata associated with the files;
   for the journaled entry, performing a reverse journal replay from a point in time to a past point in time with respect to the master file table and at least one of a LogFile and a USN Journal to establish a file system state at the past point in time to link the journaled entry to a file specified by the established file system state;
   based at least in part on the file system state at the past point in time and another file system state at another past point in time, utilizing one or more rules indicative of a signature of one or more alterations caused by a type of application executable by the information handling system to identify the type of application that caused at least one alteration to the journaling file system pertaining to the file; and
   rendering indicia of the type of application to a display.

2. The method of claim 1 wherein the journaling file system is a NTFS.

3. The method of claim 1 wherein the information comprises master file information and log file information.

4. The method of claim 1 comprising enumerating a file path for the file based at least in part on performing the reverse journal replay.

5. The method of claim 1 comprising linking the journaled entry and the established file system state.

6. The method of claim 1 further comprising repeating the parsing for another journaled entry and for the another journaled entry, performing a reverse journal replay with respect to the master file table and at least one of a LogFile and a USN Journal of the journaling file system to establish the other file system state.

7. The method of claim 1 wherein the receiving information comprises receiving information associated with operation of the information handling system for a period of time greater than one day.

8. The method of claim 2 wherein the performing a reverse journal replay comprises a LogFile rollback.

9. The method of claim 2 wherein the performing a reverse journal replay comprises a USN Journal rollback.

10. The method of claim 2 comprising performing a LogFile rollback and a USN Journal rollback.

11. The method of claim 1 further comprising, based at least in part on the performing, detecting one or more operating systems writing to the non-volatile storage medium associated with the journaling file system.

12. The method of claim 11 comprising detecting a primary operating system writing to the non-volatile storage medium and detecting an alternative operating system writing to the non-volatile storage medium.

13. The method of claim 1 further comprising, based at least in part on the performing, detecting one or more file system drivers writing to the non-volatile storage medium associated with the journaling file system.

14. The method of claim 1 wherein the type of application is an eraser application.

15. The method of claim 1 wherein the type of application is malware.

16. The method of claim 1 wherein the type of application is a file transfer application.

17. The method of claim 1 wherein the type of application is a file burner application.

18. The method of claim 1 comprising rendering, to a display, a timeline with indicia of a time of at least one of the at least one alteration.

19. A system comprising:
a processor;
memory accessible by the processor;
an interface; and
processor-executable instructions stored in the memory that instruct the system wherein the instructions comprise instructions to
receive information of a journaling file system;
parse at least a portion of the information for a journaled entry;
for the journaled entry, perform a reverse journal replay with respect to a file catalog and at least one of a change journal and a logfile of the journaling file system to establish a file system state at a past point in time to link the journaled entry to a file specified by the established file system state;
based at least in part on the file system state at the past point in time and another file system state at another past point in time, utilize one or more rules indicative of a signature of one or more alterations caused by a type of application executable by the processor to identify the type of application that caused at least one alteration to the journaling file system pertaining to the file; and
render indicia of the type of application to a display.

20. One or more computer-readable storage media comprising processor-executable instructions wherein the processor-executable instructions comprise instructions to:
receive information of a journaling file system of a computing device;
parse at least a portion of the information for a journaled entry;
for the journaled entry, perform a reverse journal replay with respect to a file catalog and at least one of a change journal and a logfile of the journaling file system to establish a file system state at a past point in time to link the journaled entry to a file specified by the established file system state;
based at least in part on the file system state at the past point in time and another file system state at another past point in time, utilize one or more rules indicative of a signature of one or more alterations caused by a type of application executable by a processor of the computing device to identify the type of application that caused at least one alteration to the journaling file system that pertains to the file; and
render indicia of the type of application to a display.

* * * * *